(12) United States Patent
Sheppard et al.

(10) Patent No.: US 11,321,623 B2
(45) Date of Patent: *May 3, 2022

(54) METHODS AND APPARATUS TO DETERMINE A CONDITIONAL PROBABILITY BASED ON AUDIENCE MEMBER PROBABILITY DISTRIBUTIONS FOR MEDIA AUDIENCE MEASUREMENT

(71) Applicant: The Nielsen Company (US), LLC, New York, NY (US)

(72) Inventors: Michael Sheppard, Brooklyn, NY (US); Paul Donato, New York, NY (US); Peter C. Doe, Ridgewood, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,572

(22) Filed: Feb. 18, 2019

(65) Prior Publication Data

US 2019/0251462 A1 Aug. 15, 2019

Related U.S. Application Data

(63) Continuation of application No. 15/196,742, filed on Jun. 29, 2016, now Pat. No. 10,210,459.

(51) Int. Cl.
*H04N 21/442* (2011.01)
*H04N 21/466* (2011.01)
(Continued)

(52) U.S. Cl.
CPC ............ *G06N 7/005* (2013.01); *H04H 60/45* (2013.01); *H04N 21/44204* (2013.01);
(Continued)

(58) Field of Classification Search
None
See application file for complete search history.

(56) References Cited

U.S. PATENT DOCUMENTS 4,621,325 A 11/1986 Naftzger et al.
4,769,697 A 9/1988 Gilley et al.
(Continued)

FOREIGN PATENT DOCUMENTS

CN 101222348 7/2008
CN 104520839 4/2015
(Continued)

OTHER PUBLICATIONS

Green, "Reversible jump Markov chain Monte Carlo computation and Bayesian model determination", Biometrika No. 82 (4), 1995, p. 711-32, 22 pages.
(Continued)

*Primary Examiner* — Brian T Pendleton
*Assistant Examiner* — Jean D Saint Cyr
(74) *Attorney, Agent, or Firm* — Hanley, Flight & Zimmerman, LLC

(57) ABSTRACT

Methods, apparatus, systems to determine a conditional probability based on audience member probability distributions for media audience measurement are disclosed. Disclosed example methods for media audience measurement include determining a first audience probability distribution for a first member of a household and determining a second audience probability distribution for a second member of the household. Disclosed example methods also include calculating probabilities for audience combinations of the first member and the second member of the household based on the first audience probability distribution and the second audience probability distribution. Disclosed example methods further include determining a household audience char- (Continued)

acteristic probability based on the calculated probabilities of the audience combinations of the household. The household audience characteristic indicates likelihoods of different possible audience compositions of the household for a media event.

25 Claims, 6 Drawing Sheets

(51) Int. Cl.
    *G06N 7/00*         (2006.01)
    *H04H 60/45*       (2008.01)
    *H04N 21/45*       (2011.01)

(52) U.S. Cl.
    CPC ... *H04N 21/44222* (2013.01); *H04N 21/4532* (2013.01); *H04N 21/4662* (2013.01)

(56) References Cited

U.S. PATENT DOCUMENTS

| | | |
|---|---|---|
| 5,113,518 A | 5/1992 | Durst, Jr. et al. |
| 5,214,780 A | 5/1993 | Ingoglia et al. |
| 5,481,294 A | 1/1996 | Thomas et al. |
| 5,512,934 A | 4/1996 | Kochanski |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 6,035,339 A | 3/2000 | Agraharam et al. |
| 6,052,730 A | 4/2000 | Feliciano et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,954,745 B2 | 10/2005 | Rajan |
| 7,039,699 B1 | 5/2006 | Narin et al. |
| 7,051,352 B1 | 5/2006 | Schaffer |
| 7,062,510 B1 | 6/2006 | Eldering |
| 7,092,926 B2 | 8/2006 | Cerrato |
| 7,146,329 B2 | 12/2006 | Conkwright et al. |
| 7,150,030 B1 | 12/2006 | Eldering et al. |
| 7,181,412 B1 | 2/2007 | Fulgoni et al. |
| 7,260,837 B2 | 8/2007 | Abraham et al. |
| 7,386,473 B2 | 6/2008 | Blumenau |
| 7,406,516 B2 | 7/2008 | Davis et al. |
| 7,526,538 B2 | 4/2009 | Wilson |
| 7,590,568 B2 | 9/2009 | Blumenau |
| 7,613,635 B2 | 11/2009 | Blumenau |
| 7,644,156 B2 | 1/2010 | Blumenau |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,739,140 B2 | 6/2010 | Vinson et al. |
| 7,756,974 B2 | 7/2010 | Blumenau |
| 7,882,054 B2 | 2/2011 | Levitan |
| 7,890,451 B2 | 2/2011 | Cancel et al. |
| 7,941,525 B1 | 5/2011 | Yavilevich |
| 7,949,565 B1 | 5/2011 | Eldering et al. |
| 7,949,639 B2 | 5/2011 | Hunt et al. |
| 7,954,120 B2 | 5/2011 | Roberts et al. |
| 7,958,234 B2 | 6/2011 | Thomas et al. |
| 7,962,603 B1 | 6/2011 | Morimoto |
| 8,046,797 B2 | 10/2011 | Bentolila et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,219,447 B1 | 7/2012 | Ieong et al. |
| 8,234,408 B2 | 7/2012 | Jungck |
| 8,235,814 B2 | 8/2012 | Willis et al. |
| 8,244,517 B2 | 8/2012 | Roy et al. |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,495,198 B2 | 7/2013 | Sim et al. |
| 8,495,680 B2 | 7/2013 | Bentolila et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,631,122 B2 | 1/2014 | Kadam et al. |
| 8,701,134 B2 | 4/2014 | Whinmill et al. |
| 8,713,168 B2 | 4/2014 | Heffernan et al. |
| 8,739,197 B1 | 5/2014 | Pecjak et al. |
| 8,751,461 B2 | 6/2014 | Abraham et al. |
| 8,775,332 B1 | 7/2014 | Morris et al. |
| 8,898,344 B2 | 11/2014 | Frank et al. |
| 8,898,689 B2 | 11/2014 | Georgakis |
| 8,904,418 B2 | 12/2014 | Rowe et al. |
| 8,910,195 B1 | 12/2014 | Barney et al. |
| 8,984,547 B2 | 3/2015 | Lambert et al. |
| 9,204,188 B1 | 12/2015 | Mirisola et al. |
| 9,224,094 B2 | 12/2015 | Oliver et al. |
| 9,277,265 B2 | 3/2016 | Wood et al. |
| 9,313,294 B2 | 4/2016 | Perez et al. |
| 9,743,141 B2 | 8/2017 | Sheppard et al. |
| 9,886,522 B2 | 2/2018 | Zhang et al. |
| 2003/0037131 A1 | 2/2003 | Verma |
| 2003/0046385 A1 | 3/2003 | Vincent |
| 2004/0088212 A1 | 5/2004 | Hill |
| 2004/0167928 A1 | 8/2004 | Anderson et al. |
| 2004/0181818 A1 | 9/2004 | Heyner et al. |
| 2005/0033657 A1 | 2/2005 | Herrington et al. |
| 2005/0223093 A1 | 10/2005 | Hanson et al. |
| 2006/0168613 A1 | 7/2006 | Wood et al. |
| 2006/0294259 A1 | 12/2006 | Matefi et al. |
| 2007/0106787 A1 | 5/2007 | Blumeanu |
| 2007/0106792 A1 | 5/2007 | Blumeanu |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0126420 A1 | 5/2008 | Wright et al. |
| 2008/0201472 A1 | 8/2008 | Bistriceanu et al. |
| 2008/0235243 A1 | 9/2008 | Lee et al. |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0076899 A1 | 3/2009 | Gbodimowo |
| 2009/0292587 A1 | 11/2009 | Fitzgerald |
| 2009/0327026 A1 | 12/2009 | Bistriceanu et al. |
| 2010/0004977 A1 | 1/2010 | Marci et al. |
| 2010/0070621 A1 | 3/2010 | Urdan et al. |
| 2010/0076814 A1 | 3/2010 | Manning |
| 2010/0088152 A1 | 4/2010 | Bennett |
| 2010/0121676 A1 | 5/2010 | Jackson |
| 2010/0205057 A1 | 8/2010 | Hook et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0299604 A1 | 11/2010 | Blumenau |
| 2010/0313009 A1 | 12/2010 | Combet et al. |
| 2011/0016482 A1 | 1/2011 | Tidwell et al. |
| 2011/0087519 A1 | 4/2011 | Fordyce, III et al. |

(56) References Cited

U.S. PATENT DOCUMENTS

| | | |
|---|---|---|
| 2011/0137733 A1 | 6/2011 | Baird et al. |
| 2011/0191664 A1 | 8/2011 | Sheleheda et al. |
| 2011/0191831 A1 | 8/2011 | Chan et al. |
| 2011/0202500 A1 | 8/2011 | Warn et al. |
| 2011/0225037 A1* | 9/2011 | Tunca .................. G06Q 30/08 705/14.46 |
| 2011/0231240 A1 | 9/2011 | Schoen et al. |
| 2011/0246297 A1 | 10/2011 | Buchalter et al. |
| 2011/0246641 A1 | 10/2011 | Pugh et al. |
| 2012/0005213 A1 | 1/2012 | Hannan et al. |
| 2012/0030037 A1 | 2/2012 | Carriero |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0151322 A1 | 6/2012 | Lindsay et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0215621 A1 | 8/2012 | Heffernan et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2012/0302222 A1 | 11/2012 | Williamson et al. |
| 2013/0013308 A1 | 1/2013 | Cao et al. |
| 2013/0046615 A1 | 2/2013 | Liyanage |
| 2013/0097311 A1 | 4/2013 | Mazumdar et al. |
| 2013/0097312 A1 | 4/2013 | Mazumdar et al. |
| 2013/0138506 A1 | 5/2013 | Zhu et al. |
| 2013/0145022 A1 | 6/2013 | Srivastava et al. |
| 2013/0204694 A1 | 8/2013 | Banister et al. |
| 2013/0212188 A1 | 8/2013 | Duterque et al. |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0332604 A1 | 12/2013 | Seth et al. |
| 2014/0122703 A1 | 5/2014 | Pugh et al. |
| 2014/0150003 A1 | 5/2014 | Doe |
| 2014/0156761 A1 | 6/2014 | Heffernan et al. |
| 2014/0181851 A1 | 6/2014 | Givon et al. |
| 2014/0337868 A1 | 11/2014 | Garza et al. |
| 2014/0358630 A1 | 12/2014 | Bhagat et al. |
| 2014/0379421 A1 | 12/2014 | Shankar et al. |
| 2014/0380348 A1 | 12/2014 | Shankar et al. |
| 2014/0380349 A1 | 12/2014 | Shankar et al. |
| 2014/0380350 A1 | 12/2014 | Shankar et al. |
| 2015/0089523 A1 | 3/2015 | Volovich et al. |
| 2015/0186510 A1 | 7/2015 | Svendsen et al. |
| 2015/0262201 A1 | 9/2015 | Rao et al. |
| 2015/0278687 A1 | 10/2015 | Sculley, II et al. |
| 2016/0165277 A1* | 6/2016 | Kirillov ............... H04N 21/251 725/14 |
| 2016/0165287 A1 | 6/2016 | Wood et al. |
| 2016/0224900 A1 | 8/2016 | Steele, Jr. et al. |
| 2016/0366480 A1 | 12/2016 | Sheppard et al. |
| 2016/0379246 A1* | 12/2016 | Sheppard .......... G06Q 30/0246 705/14.45 |
| 2018/0005128 A1 | 1/2018 | Sheppard et al. |

FOREIGN PATENT DOCUMENTS

| | | |
|---|---|---|
| CN | 104541513 | 4/2015 |
| CN | 104584564 | 4/2015 |
| JP | 2001357192 | 12/2001 |
| JP | 2006127320 | 5/2006 |
| JP | 2006127321 | 5/2006 |
| WO | 9641495 | 12/1996 |
| WO | 2005013072 | 2/2005 |
| WO | 2008150575 | 12/2008 |
| WO | 2010088372 | 8/2010 |
| WO | 2011097624 | 8/2011 |
| WO | 2012019643 | 3/2012 |
| WO | 2012040371 | 3/2012 |
| WO | 2012087954 | 6/2012 |
| WO | 2012128895 | 9/2012 |
| WO | 2012170902 | 12/2012 |
| WO | 2013122907 | 8/2013 |
| WO | 2013188429 | 12/2013 |
| WO | 2014059319 | 4/2014 |

OTHER PUBLICATIONS

Mora et al., "Television Co-Viewing in Mexico: An Assessment on People Meter Data," Journal of Broadcasting & Electronic Media, 55 (4), Dec. 1, 2011, pg. 448-469, 24 pages.

Seltman, "Experimental Design and Analysis: Chapter 3—Review of Probability," Nov. 1, 2009, p. 19-60, 42 pages.

Reddy, "Applied Data Analysis and Modeling for Energy Engineers and Scientists: Chapter 2—Probability Concepts and Probability Distributions," 2011, p. 27-60, 35 pages.

U.S. Appl. No. 61/938,617, filed Feb. 11, 2014, 17 pages.

United States Patent and Trademark Office, "Non-Final Office Action," issued in connection with U.S. Appl. No. 14/737,824, dated Sep. 9, 2016, 7 pages.

United States Patent and Trademark Office, "Notice of Allowance and Fee(s) Due," issued in connection with U.S. Appl. No. 14/737,824, dated Apr. 7, 2017, 15 pages.

United States Patent and Trademark Office, "Non-Final Office Action," issued in connection with U.S. Appl. No. 15/196,742, dated May 19, 2017, 34 pages.

United States Patent and Trademark Office, "Final Office Action," issued in connection with U.S. Appl. No. 15/196,742, dated Dec. 1, 2017, 37 pages.

United States Patent and Trademark Office, "Notice of Allowance and Fee(s) Due," issued in connection with U.S. Appl. No. 15/196,742, dated Sep. 26, 2018, 22 pages.

Danaher, "A Canonical Expansion Model for Multivariate Media Exposure Distributions: A Generalization of the Duplication of Viewing Law," Journal of Marketing Research, vol. XXVIII, Aug. 1991 (7 pages).

Enoch et al., "Cracking the Cross-Media Code: How to Use Single-Source Measures to Examine Media Cannibalization and Convergence," Journal of Advertising Research, Jun. 2010 (13 pages).

Headen et al., "The Duplication of Viewing Law and Television Media Schedule Evaluation," Journal and Marketing Research, vol. XVI, Aug. 1979 (9 pages).

Huang et al., "Modeling the Audience's Banner Ad Exposure For Internet Advertising Planning," Journal of Advertising Research, vol. 35, No. 2, Summer 2006 (15 pages).

Rust et al., "A Comparative Study of Television Duplication Models," Journal for Advertising, vol. 10, No. 3, 1981 (6 pages).

Facebook for Business, "Measuring Conversions on Facebook, Across Devices and in Mobile Apps" Aug. 14, 2014, retrieved from <https://www.facebook.com/business/news/cross-device-measurement> on Aug. 14, 2014, 3 pages.

Adam et al., "Privacy Preserving Integration of Health Care Data," AMIA 2007 Symposium Proceedings, 6 pages.

Albanesius, "Facebook Issues Fix for Several Tracking Cookies," internet article, www.pcmag.com, Sep. 28, 2011, 2 pages.

Protalinski, "Facebook denies cookie tracking allegations," internet article, www.zdnet.com, Sep. 25, 2011, 2 pages.

Protalinski, "Facebook fixes cookie behavior after logging out," internet article, www.zdnet.com, Sep. 27, 2011, 2 pages.

Protalinski, "US congressmen ask FTC to investigate Facebook cookies," internet article, www.zdnet.com, Sep. 28, 2011, 2 pages.

JavaScript and AJAX Forum, Sep. 28, 2005, retrieved from http://www.webmasterworld.com/forum91/4465.htm on Jun. 29, 2011, 4 pages.

Mental Poker, Wikipedia, Jan. 12, 2010, retrieved from http://en.wikipedia.Org/wik:i/Mental poker on Sep. 21, 2010, 5 pages.

The Nielsen Company, "Nielsen Unveils New Online Advertising Measurement," Sep. 27, 2010, retrieved from Internet at http://nielsen.com/US/en/insights/press-room/201O/nielsen_unveils_newonlineadvertisingmeasurement.html on May 31, 2012, 3 pages.

(56) References Cited

OTHER PUBLICATIONS

Cubrilovic, "Logging out of Facebook is not enough," www.nikcub.appspot.com, Sep. 25, 2011, 3 pages.

Coffey, "Internet Audience Measurement: A Practitioner's View," Journal of Interactive Advertising, vol. 1, No. 2, Spring 2001, pp. 10-17.

Vega, "Nielsen Introduces New Ad Measurement Product," The New York Times, Sep. 27, 2010 (7 pages).

Vranica, "Nielsen Testing a New Web-Ad Metric," The Wall Street Journal, Sep. 23, 2010, 2 pages.

Hothorn et al. "Unbiased Recursive Partitioning: A Conditional Inference Framework," Journal of Computational and Geographical Statistics, vol. 15, No. 3, 2006, pp. 651-674 (21 pages).

Goerg et al., "How Many Millenials Visit YouTube? Estimating Unobserved Events From Incomplete Panel Data Conditioned on Demographic Covariates," Apr. 27, 2015, 27 pages.

Goerg et al., "How Many People Visit YouTube? Imputing Missing Events in Panels With Excess Zeros," 2015, 6 pages.

"Negative Binomial Distribution", retrieved from https://en.wikipedia.org/w/ndex.php tille=Negative_binomial_distribution&oldid=853671309 on Sep. 11, 2018, 10 pages.

"Dirichlet-multinomial distribution", retrieved from https://en.wikipedia.org/w/ ndex.php?tille=Dirichlet multinomial_distribution&oldid=851139252 on Sep. 11, 2018, 12 pages.

Johnson et al., "Chapter 5: Negative Binomial Distribution," in Univariate Discrete Disributions, Wiley Series in Probality and Statistics, Third Edition, 2005, 49 pages.

"Did the Eggenberger-P6Iya (1923) paper derive the negative binomial distribution with real-valued parameter?", retrieved from hllps://stats.stackexchange.com/questions/133652/did-the-eggenberger-p%c3%b3Iya-1923-paper-:lerive-the-negative-binomial-distribution, Sep. 11, 2018, 1 page.

Goerg et al. "How Many People Visit YouTube? Imputing Missing Events in Panels With Excess Zeros," https://storage.googleapis.com/pub-tools-public-publication-data/pdf/43286.pdf, Apr. 27, 2015, 26 pages.

Rust et al. "The Mixed-Media Dirichlet Multinomial Distribution: A Model for Evaluating Television-Magazine Advertising Schedules." Journal of Marketing Research, Feb. 1984, https://journals.sagepub.com/doi/pdf/10.1177/002224378402100109, 11 pages.

Minka, "Estimating a Dirichlet Distribution," https://tminka.github.io/papers/dirichlet/minka-dirichlet.pdf, 2012, 15 pages.

* cited by examiner

METHODS AND APPARATUS TO DETERMINE A CONDITIONAL PROBABILITY BASED ON AUDIENCE MEMBER PROBABILITY DISTRIBUTIONS FOR MEDIA AUDIENCE MEASUREMENT

RELATED APPLICATION

This patent arises from a continuation of U.S. patent application Ser. No. 15/196,742 (now U.S. Pat. No. 10,210,459), which was filed on Jun. 29, 2016. The entirety of U.S. patent application Ser. No. 15/196,742 is incorporated herein by reference. Priority to U.S. patent application Ser. No. 15/196,742 is hereby claimed

FIELD OF THE DISCLOSURE

This disclosure relates generally to media audience measurement, and, more particularly, to methods and apparatus to determine a conditional probability based on audience measurement probability distributions for media audience measurement.

BACKGROUND

Audience measurement entities often enlist panelist households to participate in measurement panels. In some instances, members of the panelist households consent to allow the audience measurement entities to collect viewing data (e.g., exposure to media such as television programming, advertising, movies, etc.) of the panelist household members. To identify the panelist household members that are exposed to the media, the audience measurement entities often employ meters (e.g., personal people meters) that monitor media output devices (e.g., televisions, computers, etc.) and/or the members of the panelist household.

Audience measurement entities may also collect tuning data from other devices (e.g., set-top boxes) of panelist households and/or non-panelist households. For example, set-top boxes may record tuning data associated with tuning events of the set-top box (e.g., turning a set-top box on or off, changing a channel, changing and/or muting a volume), and the audience measurement entities may associate the collected tuning data with information associated with the corresponding household.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
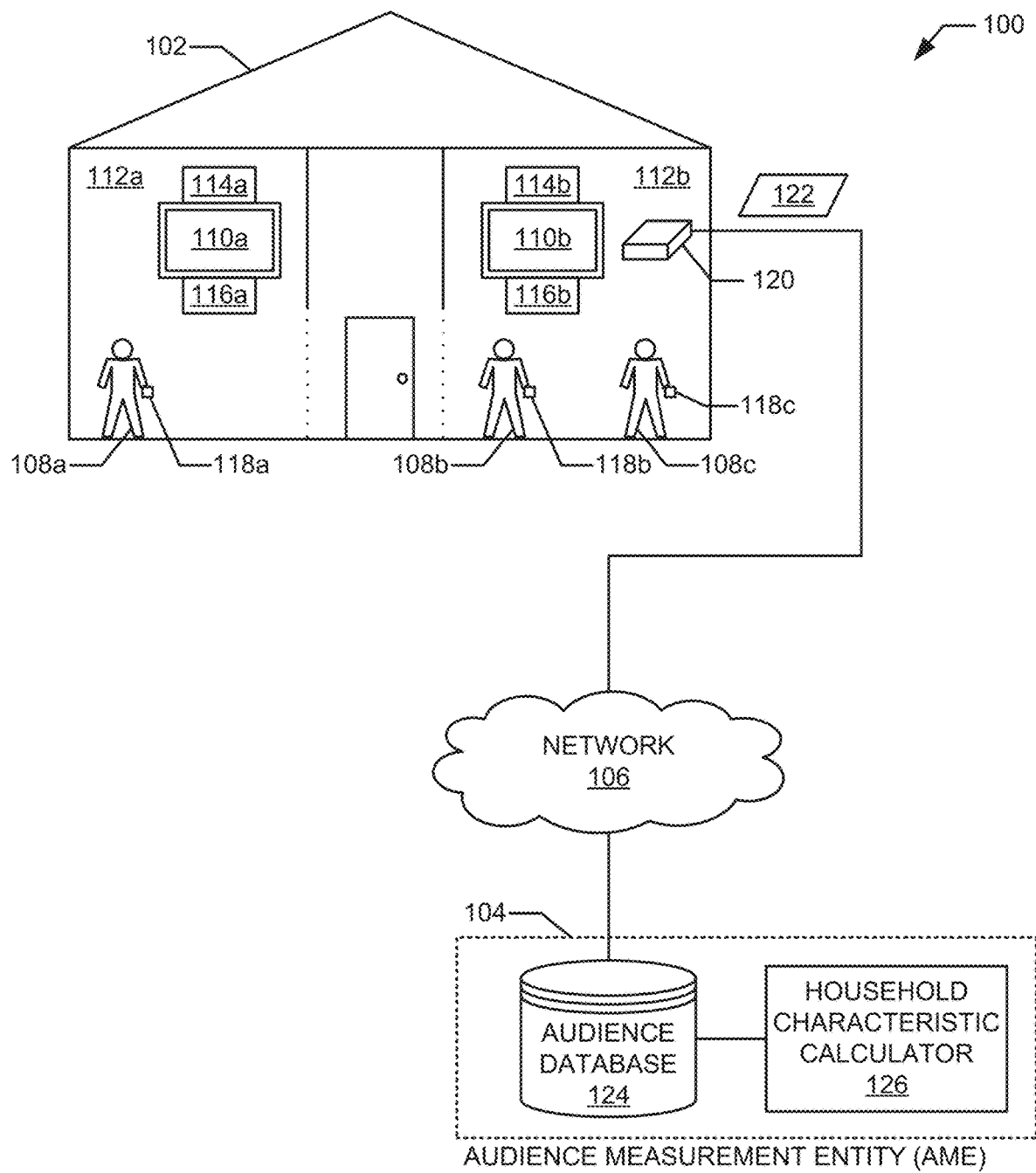
FIG. 1 is a block diagram of an example environment including an example household characteristic calculator to calculate probability distributions of members of the household to determine a probability of an audience measurement characteristic of the household.

Audience measurement entities (AMEs) and other entities measure composition and size of audiences consuming media to produce ratings of the media. Ratings may be used by advertisers and/or marketers to develop strategies and plans to purchase advertising space and/or in designing advertising campaigns. Media producers and/or distributors may use the ratings to determine how to set prices for advertising space and/or to make programming decisions. To measure the composition and size of an audience, AMEs (e.g., The Nielsen Company (US), LLC®) monitor audience members' exposure to media and associate demographics data, demographics information and/or demographics of the audience members (e.g., age, gender, race, education level, income, etc.) with the monitored media. Demographics data of an audience member and/or an audience associated with exposed media may include a plurality of characteristics of the audience member and/or the audience as a whole.

To obtain demographics data of audience members and associate exposed media with demographics data of its audience, AMEs often enlist panelists and/or panelist households to participate in measurement panels. As used herein, a "panelist" refers to an audience member who consents to an AME or other entity collecting person-specific data from the audience member. A "panelist household" refers to a household including an audience member who consents to an AME or other entity collecting person-specific data from the audience member and/or other members of the household.

The AMEs and other entities obtain data (e.g., demographics data, household characteristics data, tuning data, presentation data, exposure data, etc.) from members of the panelist households. For example, AMEs or other entities collect demographics data (age, gender, income, race, nationality, geographic location, education level, religion, etc.) from panelist household members via, for example, self-reporting by the panelist household members and/or receiving consent from the panelist household members to obtain demographics information from database proprietors (e.g., Facebook®, Twitter®, Google®, Yahoo! ®, MSN®, Apple®, Experian®, etc.). Further, the AMEs track presentation of and/or exposure to media (e.g., television programming, advertising, etc.) within the panelist households. For example, the AMEs obtain consent from members of the panelist households to collect presentation data, and/or exposure data associated with the panelist households and/or the members of the panelist households. Upon collecting the demographics data, the household characteristics data, the presentation data and/or the exposure data of the panelist households, the AMEs associate the demographics data and/or the household characteristics data of the panelist households with media presented and/or exposed within the panelist households to project a size and demographic makeup of a population as a whole.

As used herein, "presentation data" refers to information pertaining to media events that are presented via a media output device (e.g., a television, a stereo, a speaker, a computer, a portable device, a gaming console, and/or an online media output device, etc.) of a panelist household regardless of whether the media event is exposed to a member of the panelist household via the media output device.

As used herein, "exposure data" refers to information pertaining to media exposure events that are presented via a media output device (e.g., a television, a stereo, a speaker, a computer, a portable device, a gaming console, and/or an online media output device, etc.) of a panelist household and are exposed to a member (e.g., so that the media may be viewed, heard, perceived, etc. by the member) of the panelist household. For example, exposure data includes information indicating that a panelist is exposed to particular media if the panelist is present in a room in which the media is being presented.

Presentation data and/or exposure data may be collected via a meter (e.g., a people meter) that monitors media output device(s) and/or member(s) of a household. A people meter (e.g., a personal people meter) is an electronic device that is typically positioned in a media access area (e.g., a viewing area such as a living room of the panelist household) and is proximate to and/or carried by one or more panelists. To collect exposure data, a panelist may interact with the people meter that monitors the media output device(s) of the panelist household.

Monitoring panelists for audience measurement can be a difficult and costly process for AMEs. For example, panelists must diligently perform specific tasks to enable the collected data (e.g., exposure data, presentation data, tuning data, demographics data, etc.) to accurately reflect the activities of the panelists. For example, to identify that a panelist is exposed to a particular media, some AMEs provide the panelist and/or panelist household with a meter (e.g., a people meter) that monitors media output devices of the corresponding panelist household. A people meter is an electronic device that is typically positioned in a media access area (e.g., an exposure area such as a living room of the panelist household) and is proximate to and/or carried by one or more panelists. To enable the data collected from the people meter to more accurately reflect the activities of the panelists, some example people meters generate a prompt for panelists to provide presence and/or identity information by depressing a button of the people meter. Although periodically inputting information in response to a prompt may not be burdensome, some panelists may forget and/or elect not to provide presence and/or identity information in some instances in which they are exposed to media output devices.

Because monitoring panelists can be difficult and costly, AMEs and other entities interested in measuring media/audiences have begun to collect information from panelist households via other sources, such as data collected by media presentation devices. An example media presentation device is a set-top box (STB). An STB is a device that converts source signals into media presented via a media presentation device. In some examples, the STB implements a digital video recorder (DVR) and/or a digital versatile disc (DVD) player. Other example media presentation devices include over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.), televisions with media tuners, stereos, speakers, computers, portable devices, gaming consoles, online media output devices, radios, etc. Some media presentation devices such as televisions, STBs and over-the-top devices are capable of recording tuning data for media presentation.

As used herein, "tuning data" refers to information pertaining to tuning events (e.g., a STB being turned on or off, channel changes, volume changes, tuning duration times, etc.) of a media presentation device of a household that is not associated with demographics data (e.g., number of household members, age, gender, race, etc.) of the household and/or members of the household. To collect the tuning data of a media presentation device, an AME or other entity (e.g., a third-party media provider and/or manufacturer) typically obtains consent from the household for such data acquisition. Many people are willing to provide tuning data on a media presentation device when personalized information is not collected and repeated actions are not required of the household members.

Thus, example tuning data may indicate that an STB of the household is turned on and outputting a particular media stream to a television, example presentation data may indicate that a television of the household was turned on and presenting the particular media, and example exposure data may indicate that a member of the household was exposed to the particular media that was tuned by the STB and presented by the television of the household. By combining such data, an AME or other entity can collect tuning data indicating, for example, that an STB of a panelist household was tuned to a particular program (e.g., "Brooklyn Nine-Nine" on FOX at 9:00 P.M. on Sunday) but that no panelist(s) of the household were exposed to that program (e.g., as a result of the corresponding television being off, as a result of the panelist(s) failing to provide presence and/or identity information when exposed to the program, etc.).

Example methods and apparatus disclosed herein enable AMEs or other entities to determine a likelihood or probability that a panelist of a household was exposed to a media event (e.g., a tuned program) based on other recorded exposure data associated with that panelist. Further, example methods and apparatus disclosed herein enable AMEs or other entities to determine conditional probabilities related to whether any panelist(s) of the household were exposed to the media event.

As used herein, a "conditional probability" is a probability that an event has occurred given that another event has occurred. Example conditional probabilities indicate a likelihood that a first member and a third member were exposed to a media event given that two of the members of the household were exposed to the media event, a likelihood that the third member of the household was exposed to the media event given that the first member of the household was exposed to the same media event, and/or a likelihood of other co-viewing events.

As used herein, "co-viewing" or "co-exposure" refers to instances in which multiple members (e.g., panelists) of a household (e.g., a panelist household) are exposed to a media event together. An example co-viewing event includes two members of a household being exposed to the same media event (e.g., "Brooklyn Nine-Nine" on FOX at 9:00 P.M. on Sunday) together via a television of the household (e.g., the two members were in the same room when being exposed to the same media event).

Example methods and apparatus disclosed herein determine a probability or likelihood of an audience characteristic of a household (e.g., a panelist household) based on probability distributions of respective members (e.g., panelists) of the household. For example, the methods and apparatus disclosed herein enable an AME or other entity to determine a conditional probability for an audience characteristic of the household (e.g., a co-viewing conditional probability).

To determine the conditional probability for the audience characteristic of the household, the AME or other entity determines probability distributions (e.g., beta distributions, Dirichlet distributions) based on recorded exposure data for respective members of the panelist household. For example, an AME or other entity determines a probability distribution (e.g., a beta distribution) for a household member and a particular media event (e.g., "Brooklyn Nine-Nine" on FOX at 9:00 P.M. on Sunday) based on recorded exposure data associated with the member and other instances of the same and/or similar media events (e.g., a first value indicating a number of occurrences in which the member was exposed to the media events, a second value indicating a number of occurrences in which the member was not exposed to the media events).

Based on the determined probability distributions of the respective household members, the AME or other entity performs sets of simulations via distribution-value random selectors (e.g., Monte Carlo simulations) and averages the results of the sets of simulations to calculate probabilities for combinations of the members of the household. For example, the AME or other entity performs and averages the sets of simulations to determine percentages indicating likelihoods or probabilities that first and second members (but not a third member) were exposed to the media event, the first and third members (but not the second member) were exposed to the media event, the second and third members (but not the first member) were exposed to the media event, etc.

The AME or other entity determines the conditional probability for the audience characteristic of the household based on the calculated probabilities for the combinations of the household members. For example, the AME or other entity determines a co-viewing conditional probability concerning a likelihood that the first and second members (but not the third member) were exposed together to the media event given that two of three members of the household were exposed to the media event in question.

By utilizing probability distributions associated with members of a household to determine conditional probabilities of audience combinations of the members of the household, the example methods and apparatus disclosed herein can reduce an amount of exposure data of the household members that needs to be collected to enable AMEs and/or other entities to accurately determine conditional probabilities associated with the household members. For example, utilizing the probability distributions to determine the conditional probabilities accounts for and/or reduces uncertainty inherent to the collected exposure data of the household members (e.g., resulting from a small sample size). Thus, because the conditional probabilities account for and/or reduce the uncertainty resulting from small sample sizes of collected exposure data, the example methods and apparatus enable the AME and/or other entity to accurately determine the conditional probabilities based on a reduced sample size of collected exposure data.

Further, the example methods and apparatus disclosed herein relate to subject matter disclosed in U.S. patent application Ser. No. 14/737,824, entitled "Methods and Apparatus to Determine Viewing Condition Probabilities" and filed on Jun. 12, 2015, which is incorporated herein by reference in its entirety.

Disclosed example methods for media audience measurement include determining, by executing an instruction with a processor, a first audience probability distribution for a first member of a household and determining, by executing an instruction with the processor, a second audience probability distribution for a second member of the household. The example methods include calculating, by executing an instruction with the processor, probabilities for audience combinations of the first member and the second member of the household based on the first audience probability distribution and the second audience probability distribution and determining, by executing an instruction with the processor, a household audience characteristic probability based on the calculated probabilities of the audience combinations of the household. In some examples, the household audience characteristic indicates likelihoods of different possible audience compositions of the household for a media event.

In some disclosed example methods, the determining of the first audience probability distribution is based on a first count of a first audience parameter and a second count for a second audience parameter for the first member and the determining of the second audience probability distribution is based on a third count of the first audience parameter and a fourth count for the second audience parameter for the second member. The first audience parameter corresponds to exposure to the media event and the second audience parameter corresponds to non-exposure to the media event. In some such disclosed example methods, the determining of the first audience probability distribution includes determining a first beta distribution for the first member and the determining of the second audience probability distribution includes determining a second beta distribution for the second member.

In some disclosed example methods, the determining of the first audience probability distribution includes determining a first Dirichlet distribution for the first member based on a first count of a first audience parameter, a second count for a second audience parameter, and a third count for a third audience parameter for the first member. In such example methods, the determining of the second audience probability distribution includes determining a second Dirichlet distribution for the second member based on a fourth count of the first audience parameter, a fifth count for the second audience parameter, and a sixth count for the third audience parameter for the second member. The first audience parameter corresponds to exposure to the media event via a first media presentation device of the household, the second audience parameter corresponds to exposure to the media event via a second media presentation device of the household, and the third audience parameter corresponds to non-exposure to the media event.

In some disclosed example methods, the determining of the household audience characteristic probability includes determining a conditional probability based on the calculated probabilities for the audience combinations of the household.

In some disclosed example methods, the calculating of the probabilities for the audience combinations includes performing a first set of simulations that includes a first simulation for the first member and a second simulation for the second member. The first simulation randomly selects a first value from the first audience probability distribution, and the second simulation randomly selects a second value from the second audience probability distribution. In such disclosed example methods, calculating the probabilities for the audience combinations includes calculating a first probability of a first audience combination based on the randomly-selected first value and the randomly-selected second value of the first set of simulations and performing a second set of simulations that includes a third simulation for the first member and a fourth simulation for the second member. The third simulation randomly selects a third value from the first audience probability distribution, and the fourth simulation randomly selects a fourth value from the second audience probability distribution of the second set of simulations. In such disclosed example methods, calculating the probabilities for the audience combinations includes calculating a second probability of the first audience combination based on the randomly-selected third value and the randomly-selected fourth value and determining an average first audience combination probability based on the first probability and the second probability.

In some disclosed example methods, the determining of the household audience characteristic probability based on the first audience probability distribution and the second audience probability distribution reduces an amount of data collected by computer networked data collection systems for the first member and the second member of the household.

In some disclosed example methods, the processor includes at least a first processor of a first hardware computer system and a second processor of a second hardware computer system.

Disclosed example apparatus for media audience measurement include a distribution determiner to determine a first audience probability distribution for a first member of a household and determine a second audience probability distribution for a second member of the household. The example apparatus include a simulation averager to calculate probabilities for audience combinations of the first member and the second member of the household based on the first audience probability distribution and the second audience probability distribution. The example apparatus include an audience characteristic calculator to determine a household audience characteristic probability based on the calculated probabilities of the audience combinations of the household. In some examples, the household audience characteristic indicates likelihoods of different possible audience compositions of the household for a media event.

In some disclosed example apparatus, the distribution determiner is to determine the first audience probability distribution based on a first count of a first audience parameter and a second count for a second audience parameter for the first member and determine the second audience probability distribution based on a third count of the first audience parameter and a fourth count for the second audience parameter for the second member. The first audience parameter corresponds to exposure to the media event and the second audience parameter corresponds to non-exposure to the media event. In some such disclosed example apparatus, the distribution determiner is to determine a first beta distribution for the first member to determine the first audience probability distribution and determine a second beta distribution for the second member to determine the second audience probability distribution.

In some disclosed example apparatus, the distribution determiner is to determine a first Dirichlet distribution for the first member to determine the first audience probability distribution. The first Dirichlet distribution is determined based on a first count of a first audience parameter, a second count for a second audience parameter, and a third count for a third audience parameter for the first member. In such example apparatus, the distribution determiner is to determine a second Dirichlet distribution for the second member determine the second audience probability distribution. The second Dirichlet distribution is determined based on a fourth count of the first audience parameter, a fifth count for the second audience parameter, and a sixth count for the third audience parameter for the second member. The first audience parameter corresponds to exposure to the media event via a first media presentation device of the household, the second audience parameter corresponds to exposure to the media event via a second media presentation device of the household, and the third audience parameter corresponds to non-exposure to the media event.

In some disclosed example apparatus, to determine the household audience characteristic probability, the audience characteristic calculator is to determine a conditional probability based on the calculated probabilities for the audience combinations of the household.

Some disclosed example apparatus further include a probability simulator to perform a first set of simulations that includes a first simulation for the first member and a second simulation for the second member. The first simulation is to randomly select a first value from the first audience probability distribution, and the second simulation is to randomly select a second value from the second audience probability distribution. The probability simulator is to calculate a first probability of a first audience combination based on the randomly-selected first value and the randomly-selected second value of the first set of simulations. The probability simulator is to perform a second set of simulations that includes a third simulation for the first member and a fourth simulation for the second member. The third simulation randomly is to randomly select a third value from the first audience probability distribution, and the fourth simulation is to randomly select a fourth value from the second audience probability distribution of the second set of simulations. The probability simulator is to calculate a second probability of the first audience combination based on the randomly-selected third value and the randomly-selected fourth value. The simulation averager is to determine an average first audience combination probability based on the first probability and the second probability calculated by the probability simulator.

Turning to the figures, FIG. 1 illustrates an example environment 100 in which probabilities of audience characteristics of a panelist household are determined based on probability distributions of members of the household that are calculated utilizing exposure data collected from the household. In the illustrated example, the environment 100 includes an example household 102 of a population (e.g., a sample population, a sub-population of a population as a whole, a panelist population, etc.). As illustrated in FIG. 1, the example environment 100 includes an example audience measurement entity (AME) 104 that determines the audience characteristics of the household 102 based on data (e.g., exposure data, presentation data, tuning data, etc.) collected from the household 102 and received via an example network 106 that communicatively couples the household 102 to the AME 104.

The household 102 of the illustrated example is a panelist household of the population from which data is collected to estimate audience characteristics of example members 108a, 108b 108c of the household 102 (e.g., characteristics such as probability distributions indicating likelihoods that the respective members 108a, 108b, 108c of the household 102 were exposed to "Brooklyn Nine-Nine" on FOX at 9:00 P.M. on Sunday) and/or audience characteristics of the household 102 (e.g., characteristics such as a conditional probability indicating the likelihood that if two of the members 108a, 108b, 108c were exposed to "Brooklyn Nine-Nine," those two members are member 108a and member 108c). The household 102 of FIG. 1 constitutes one of many households of the population and is representative of those other households. In some examples, characteristics of the other households are similar to and/or are different from those of the representative household 102. For example, other households of the population may include one member, two members, four members, etc. The household 102 may be enlisted as a panelist household of the population using any desired methodology (e.g., random selection, statistical selection, phone solicitations, Internet advertisements, surveys, advertisements in shopping malls, product packaging, etc.).

As illustrated in FIG. 1, the panelist household 102 includes the members 108a, 108b, 108c (e.g., panelists) of the population. The example household 102 includes media output devices (e.g., televisions, stereos, speakers, computers, portable devices, gaming consoles, and/or an online media output devices, etc.) that present media (e.g., television programming, movies, advertisements, Internet-based programming such as websites, etc.) to the members 108a, 108b, 108c of the household 102. For example, the household 102a includes an example television 110a that presents media in an example room 112a (e.g., a bedroom, a living room, a family room, a kitchen, etc.) of the household 102 and an example television 110b that presents media in another example room 112b (e.g., a bedroom, a living room, a family room, a kitchen, etc.) of the household 102.

The example televisions 110a, 110b are communicatively coupled to respective example meters 114a, 114b (e.g., stationary meters, set-top box meters, etc.) that are placed in, on, under, and/or near the televisions 110a, 110b to monitor tuned media. The meters 114a, 114b of the illustrated example collect information pertaining to tuning events (e.g., a set-top box being turned on or off, channel changes, volume changes, tuning duration times, etc.) associated with the televisions 110a, 110b of the respective rooms 112a, 112b of the household 102. For example, the meter 114a collects tuning data associated with the television 110a located in the room 112a, and the meter 114b collects tuning data associated with the television 110b located in the room 112b. Thus, the example meters 114a, 114b collect tuning data associated with the respective rooms 112a, 112b of the household 102 (e.g., the meter 114a in the room 112a may collect tuning data indicating the television 110a was tuned to "Brooklyn Nine-Nine" on FOX at 9:00 P.M. on Sunday, the meter 114b in the room 112b may collect tuning data indicating the television 110b was tuned to "Brooklyn Nine-Nine" on FOX at 9:00 P.M. on Sunday) and/or associated with the household 102 (e.g., the tuning data indicating at least one of the televisions 110a, 110b in the household 102 was tuned to "Brooklyn Nine-Nine" on FOX at 9:00 P.M. on Sunday). In some examples, the collected tuning data does not identify which, if any, of the televisions 110a, 110b presented the media or which, if any, of the members 108a, 108b, 108c were exposed to the tuned media.

As illustrated in FIG. 1, example meters 116a, 116b (e.g., people meters) may be included in the example household 102 to monitor exposure data of media presented via the televisions 110a, 110b by identifying panelists (e.g., the members 102a, 102b, 102c) located in media access areas (e.g., the rooms 112a, 112b) of the respective televisions 110a, 110b. For example, the meters 116a, 116b may prompt audience members (e.g., the members 102a, 102b, 102c) to register their presence in the viewing/listening environment by, for example, pressing a button on the meters 116a, 116b and/or a remote control device in communication with the 116a, 116b. In some examples, the meters 116a, 116b may be integrated in the respective meters 114a, 114b or may be separate devices.

Further, the environment 100 of the illustrated example includes meters 118a, 118b, 118c (e.g., personal people meters) that are worn, carried by, and/or otherwise positioned on or near the corresponding members 108a, 108b, 108c, of the household 102. The example meters 118a, 118b, 118c collect information pertaining to media events that are exposed to the members 108a, 108b, 108c of the respective household 102 (e.g., via the televisions 110a, 110b located in the respective rooms 112a, 112b of the household 102). For example, the meter 118a collects exposure data associated with the member 102a (e.g., such as exposure data indicating the member 102a was exposed to "Brooklyn Nine-Nine" on FOX at 9:00 P.M. on Sunday), the meter 118b collects exposure data associated with the member 102b (e.g., such as exposure data indicating the member 102b was not exposed to "Brooklyn Nine-Nine" on FOX at 9:00 P.M. on Sunday), and the meter 118c collects exposure data associated with the member 102c (e.g., such as exposure data indicating the member 102c was exposed to "Brooklyn Nine-Nine" on FOX at 9:00 P.M. on Sunday). Further, the example meters 118a, 118b, 118c collect exposure data associated with the televisions 110a, 110b (e.g., the member 102a was exposed to "Brooklyn Nine-Nine" on FOX at 9:00 P.M. on Sunday via the television 110b) and/or the rooms 112a, 112b (e.g., the member 102a was exposed to "Brooklyn Nine-Nine" on FOX at 9:00 P.M. on Sunday in the room 112b) and, thus, collects exposure data associated with the household 102 (e.g., the members 102a, 102c of the household 102 were exposed to "Brooklyn Nine-Nine" on FOX at 9:00 P.M. on Sunday). Additionally or alternatively, the meters 118a, 118b, 118c may monitor media presented by the televisions 110a, 110b when the corresponding members 108a, 108b, 108c are proximate to and/or within respective media access areas (e.g., the rooms 112a, 112b) of the televisions 110a, 110b.

In the illustrated example, watermarks, metadata, signatures, etc. are collected and/or generated by the meters 114a, 114b, the meters 116a, 116b, and/or the meters 118a, 118b, 118c for use in identifying the media and/or a station that transmits the media. Such watermarks, metadata, signatures, etc. are included in the media exposure data collected by the meters 114a, 114b, the meters 116a, 116b, and/or the meters 118a, 118b, 118c.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein, "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In the illustrated example, the tuning data, the presentation data, and/or the exposure data of the household 102 are collected by an example home processing system 120 of the household 102. The example household processing system 120 is communicatively coupled to the meters 114a, 114b, 114c, the meters 116a, 116b, and/or the meters 118a, 118b, 118c of the household 102 via one or more wireless and/or wired connection(s). From time to time, the home processing system 120 of the illustrated example collects the data (e.g., the tuning data, the presentation data, the exposure data, etc.) from the meters 114a, 114b, the meters 116a, 116b, and/or the meters 118a, 118b, 118c.

As illustrated in FIG. 1, the home processing system 120 communicates household data 122 of the household 102 of the population to the AME 104. For example the household data 122 communicated to the AME 104 includes the tuning data, the presentation data, the exposure data, etc., collected by the meters 114a, 114b, the meters 116a, 116b, and/or the meters 118a, 118b, 118c of the household 102. As illustrated in FIG. 1, the example home processing system 120 communicates the household data 122 to the AME 104 via the network 106 (e.g., the Internet, a local area network, a wide area network, a cellular network, etc.), with access provided by one or more wired and/or wireless connections (e.g., a cable/DSL/satellite modem, a cell tower, etc.). In some examples, the meters 114a, 114b, the meters 116a, 116b, and/or the meters 118a, 118b, 118c communicate the collected data to the AME 104 via the network 106 individually. In some such examples, the home processing system 120 may be omitted.

The AME 104 of the illustrated example includes an example audience database 124 and an example household characteristic calculator 126. As illustrated in FIG. 1, the audience database 124 collects the household data 122 of the household 102. For example, the audience database 124 collects tuning data collected by media presentation devices (e.g., the meters 114a, 114b), presentation data collected by media output devices (e.g., the meters 114a, 114b), and/or exposure data collected by personal people meters (e.g., the meters 116a, 116b, 118a, 118b, and/or 118c).

The example household characteristic calculator 126 collects the household data 122 from the audience database 124. Based on the household data 122 (e.g., the exposure data recorded by the meters 118a, 118b, 118c of the respective members 108a, 108b, 108c), the household characteristic calculator 126 determines probability distributions (e.g., beta distributions, Dirichlet distributions) regarding exposure of the respective members 108a, 108b, 108c of the household 102 to a media event of interest (e.g., "Brooklyn Nine-Nine" on FOX at 9:00 P.M. on Sundays). For example, the household characteristic calculator 126 determines a beta distribution for the member 108a based on a first value indicating a number of instances in which the member 108a was recorded to have been exposed to the media event of interest and a second value indicating a number of instances in which the member 108a was recorded not to have been exposed to the media event of interest.

Based on the probability distributions of the respective household members 108a, 108b, 108c, the example household characteristic calculator 126 performs sets of simulations (e.g., 10,000 sets of simulations) via distribution-value random selectors (e.g., Monte Carlo simulations). For example, the household characteristic calculator performs a first set of simulations in which one simulation randomly selects a value from the probability distribution of the member 108a, another simulation randomly selects a value from the probability distribution of the member 108b, and another simulation randomly selects a value from the probability distribution of the member 108c. The household characteristic calculator 126 averages the results of the sets of simulations to calculate probabilities for combinations (e.g., co-exposure combinations) of the members 108a, 108b, 108c of the household 102. For example, the household characteristic calculator 126 determine percentages indicating combination probabilities that the member 108a (but not the members 108b, 108c) was exposed to the media event, the member 108b (but not the members 108a, 108c) was exposed to the media event, the member 108c (but not the members 108a, 108b) was exposed to the media event, the members 108a, 108b (but not the member 108c) were exposed to the media event, etc.

Further, the example household characteristic calculator 126 determines a conditional probability for an audience characteristic of the household 102 based on the calculated combination probabilities of the household members 108a, 108b, 108c. For example, the household characteristic calculator 126 may determine a co-exposure conditional probability that identifies a probability that, given two of the three members 108a, 108b, 108c of the household 102 are exposed to the media event together, those two members are the member 108a and the member 108b. Thus, the household characteristic calculator 126 of the example AME 104 determines conditional probabilities of audience characteristics of the household 102 based on probability distributions of members 108a, 108b, 108c relating to their exposure to a media event of interest.

In operation, the example meters 114a, 114b collect tuning data associated with the corresponding televisions 110a, 110b of the household 102 and/or presentation data of the respective example televisions 110a, 110b of the household 102. The example meters 116a, 116b, 118a, 118b, 118c collect exposure data of the example members 108a, 108b, 108c of the household 102. The example home processing system 120 collects the household data 122 of the households 102 (e.g., the tuning data, the presentation data, and the exposure data collected by the meters 114a, 114b, the meters 116a, 116b, and/or the meters 118a, 118b, 118c, respectively) and communicates the household data 122 to the example audience database 124 of the example AME 104 via the example network 106.

The example household characteristic calculator 126 collects the household data 122 from the audience database 124 and determines probability distributions regarding exposure of the respective members 108a, 108b, 108c of the household 102 to a media event of interest based on the household data 122. The media event of interest may be a program (e.g., "Brooklyn Nine-Nine"), a channel (e.g., FOX), a day (e.g., Sunday), a time (e.g., 9:05 P.M., anytime between 9:00 P.M. and 9:30 P.M.), a day-part (e.g., a "primetime" daypart), any combination thereof (e.g., a program/channel/day/time combination such as "Brooklyn Nine-Nine" on FOX at 9:00 P.M. on Sunday), etc. The household characteristic calculator 126 performs sets of simulations based on the probability distributions and averages the results of the sets of simulations to calculate probabilities for (co-exposure) combinations of the members 108a, 108b, 108c. Further, the example household characteristic calculator 126 determines a (co-exposure) conditional probability for an audience characteristic of the household 102 based on the calculated combination probabilities of the household members 108a, 108b, 108c.

Determining conditional probabilities (e.g., co-exposure conditional probabilities) for panelist households based on probability distributions associated with recorded exposure data of members of the panelist households reduces an amount of exposure data that needs to be collected to enable AMEs and/or other entities to accurately determine the conditional probabilities. For example, the probability distributions account for and/or reduce uncertainty associated with the collected exposure data (e.g., resulting from a small sample size) of the household members. As a result, the example methods and apparatus enable the AME and/or other entity to accurately determine the conditional probabilities based on a reduced sample size of collected exposure data. Further, utilizing the probability distributions that are based on exposure data related to the members of the panelist household enables AMEs and/or other entities to utilize tuning data collected from set top boxes and/or other media presentation devices of the panelist households to determine conditional probabilities related to the panelists' exposure to a media event (e.g., in instances in which tuning data, but not exposure data, is collected for a media event of interest).

Figure 2:
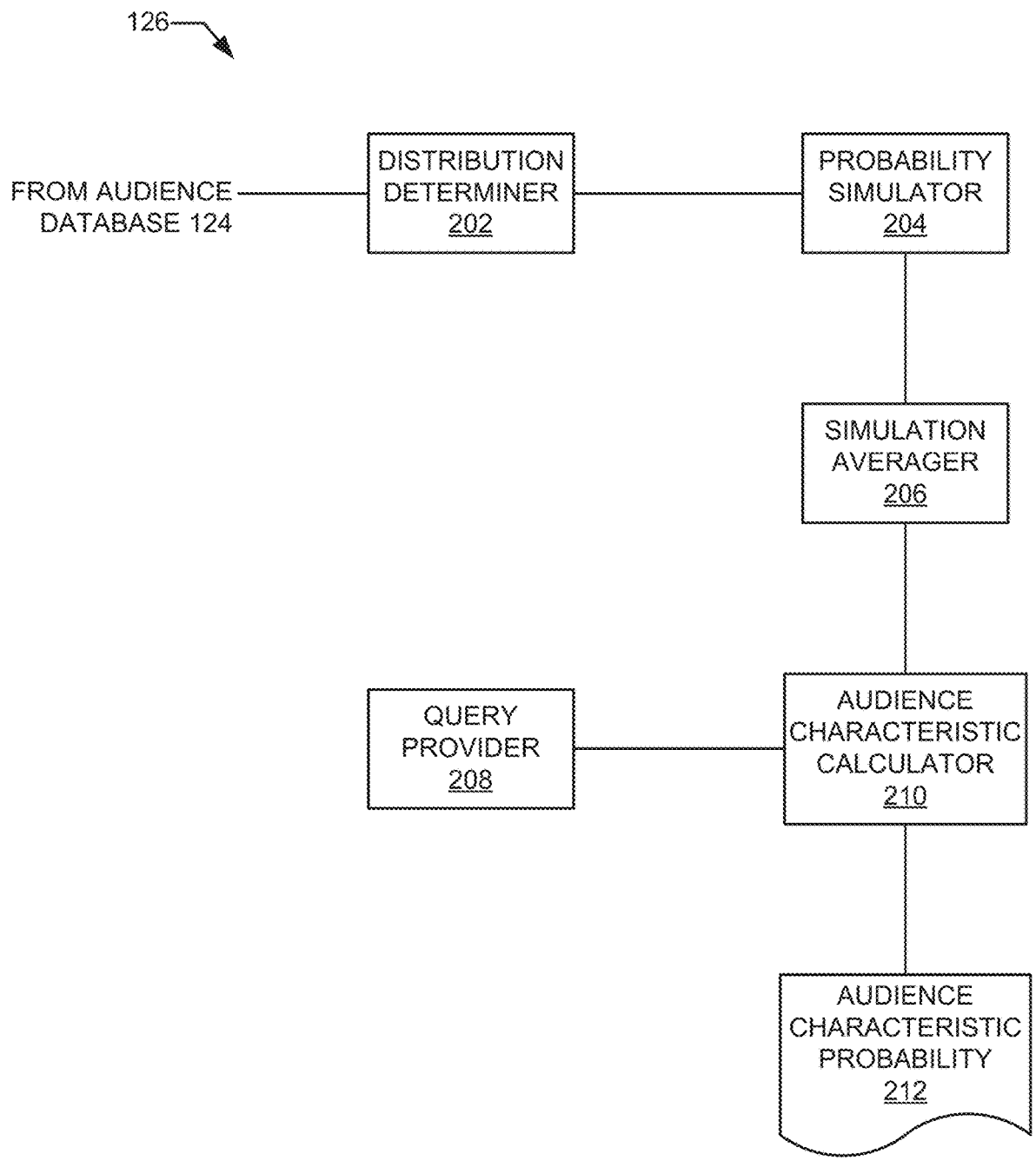
FIG. 2 is a block diagram of an example implementation of the household characteristic calculator of FIG. 1 that is to calculate the probability of the audience measurement characteristic of the household.

FIG. 2 is a block diagram of an example implementation of the example household characteristic calculator 126 of FIG. 1 that is to calculate the probability of the audience measurement characteristic of the household 102. As illustrated in FIG. 2, the example household characteristic calculator 126 includes an example distribution determiner 202, an example probability simulator 204, an example simulation averager 206, an example query provider 208, and an example audience characteristic calculator 210.

The distribution determiner 202 of the illustrated example determines probability distributions (e.g., beta distributions, Dirichlet distributions) for the members 108a, 108b, 108c of the household 102 based on the household data 122 stored in the audience database 124 of FIG. 1. For example, the distribution determiner 202 determines a first audience probability distribution for the member 108a, a second audience probability distribution for the member 108b, and a third audience probability distribution for the member 108c. The audience probability distributions for the household members 108a, 108b, 108c model likelihoods that the respective members 108a, 108b, 108c were exposed to a random occurrence of the media event of interest in the household 102.

To determine a probability distribution (e.g., the first audience probability distribution) for a corresponding one of the household members (e.g., the member 108a), the distribution determiner 202 collects the household data 122 associated with that member. Based on the collected household data 122, the distribution determiner 202 identifies quantities, counts, and/or number of occurrences in which the household member 108a is associated with respective audience parameters.

In some examples, the distribution determiner 202 identifies a quantity, count and/or number of occurrences (e.g., a first count) in which the collected household data 122 indicates that a household member (e.g., the member 108a) was exposed to a media event of interest (e.g., a first audience parameter) and identifies another quantity, count and/or number of occurrences (e.g., a second count) in which the collected household data 122 indicates that the household member was not exposed to the media event of interest (e.g., a second audience parameter). Based on the identified counts of the audience parameters, the example distribution determiner 202 determines a probability distribution for the household member 108a that models a likelihood of the audience parameters being true for a random occurrence of the media event of interest. For example, if the household data 122 collected from the audience database 124 indicates that the member 108a was exposed to the media event of interest on five instances (e.g., the first count of the first audience parameter) and was not exposed to the media event of interest on two instances (e.g., the second count of the second audience parameter), the distribution determiner 202 develops a beta distribution that models a likelihood of the member 108a being exposed to a random occurrence of the media event based on the five instances in which the member 108a was identified as being exposed to the media event and the two instances in which the member 108a was identified as not being exposed to the media event.

When the distribution determiner 202 collects two audience parameters associated with the member 108a (e.g., the number of instances the member 108a was exposed to the media event, the number of instances the member 108a was not exposed to the media event), the example distribution determiner 202 determines a beta distribution for the member 108a. A beta distribution is a type of statistical distribution in which a value of first parameter (e.g., also referred to as an α parameter, a first audience parameter, etc.) and a value of a second parameter (e.g., also referred to as a β parameter, a second audience parameter, etc.) are utilized to model a variable associated with the first and second parameters (e.g., a distribution indicating a likelihood that the first parameter and/or the second parameter is satisfied). For example, the beta distribution determined by the distribution determiner 202 represents a probability density function that may be represented by line graph in which each probability or likelihood that the household member 108a is exposed to the media event (e.g., along an x-axis, ranging from 0 to 1, or 0% to 100%) is plotted against a confidence score or level in the corresponding probability (e.g., along a y-axis).

In other examples, the distribution determiner 202 identifies counts for more than two audience parameters. For example, the distribution determiner 202 identifies a first count for a first audience parameter indicating a number of instances that the household member 108a was exposed to a media event in a first manner (e.g., exposed in the first room 112a and/or via the first television 110a of the household 102); a second count of a second audience parameter indicating a number of instances that the household member 108a was exposed to the media event in a second manner (e.g., in the second room 112b and/or via the second television 110b); and a third count of a third audience parameter indicating a number of instances in which the household member 108a was recorded as not being exposed to the media event in the household 102. Based on the counts of the respective audience parameters, the distribution determiner 202 determines a probability distribution for the household member 108a that models a likelihood of the audience parameters being true for a random occurrence of the media event.

For example, when the distribution determiner 202 collects three or more audience parameters associated with the member 108a, the distribution determiner 202 determines a Dirichlet distribution for the member 108a. A Dirichlet distribution is a type of statistical distribution in which values or counts of respective parameters are utilized to model a variable associated with those parameters. For example, the distribution determiner 202 utilizes a value of a first parameter (e.g., also referred to as an α parameter, such as a parameter indicating a household member was exposed to a media event in the first room 112a and/or via the first television 110a), a value of a second parameter (e.g., also referred to as a β parameter, such as a parameter indicating the household member was exposed to the media event in the second room 112b and/or via the second television 110b), and a value of a third parameter (e.g., also referred to as a γ parameter, such as a parameter indicating the member was not exposed to a media event in the household 102) to model a variable associated with the first, second, and third parameters (e.g., whether and in which room 112a, 112b of the household 102 the household member 108a was exposed to the media event). The Dirichlet distribution developed by the distribution determiner 202 may be represented by a graph in which each probability or likelihood that the household member 108a is exposed to the media event in the first room 112a (e.g., ranging from 0 to 1, or 0% to 100%, along an x-axis) and each probability or likelihood that the household member 108a is exposed to the media event in the second room 112b (e.g., ranging from 0 to 1, 0% to 100%, along an y-axis) is plotted against a confidence score or level of the corresponding probabilities (e.g., along a z-axis).

Based on the determined probability distributions (e.g., beta distributions, Dirichlet distributions, etc.) for the respective members 108a, 108b, 108c of the household 102, the example probability simulator 204 performs sets of simulations to calculate probabilities for audience combinations (e.g., co-exposure combinations) of the household 102. For the example household 102 of FIG. 1, each set of simulations includes an independent simulation for each of the members 108a, 108b, 108c of the household 102. That is, a set of simulations performed by the probability simulator 204 for the household 102 includes a first simulation for the member 108a, a second simulation for the member 108b, and a third simulation for the members 108c.

Each simulation performed by the probability simulator 204 produces a probability value that the corresponding household member (e.g., one of the members 108a, 108b, 108c) is exposed to the media event of interest and is based on the probability distribution of the corresponding household member that was determined by the distribution determiner 202. For example, the probability simulator 204 utilizes Monte Carlo simulations and/or any other techniques, methods and/or algorithms that randomly select values (e.g., probability values) from respective data sets (e.g., probability distributions). For example, the probability simulator 204 utilizes Monte Carlo techniques to randomly select a probability that the household member 102a was exposed to an occurrence of the media event of interest (e.g., "Brooklyn Nine-Nine" on FOX) based on the probabilities and the correspondence confidence scores of the probability distribution (e.g., the beta distribution, the Dirichlet distribution) of the household member 102a. Similarly, the probability simulator 204 utilizes Monte Carlo techniques to perform respective simulations for the other members 108b, 108c of the household 102 to randomly select probabilities that those household members 108b, 108c were exposed to the media event. For example, the probability simulator 204 may determine a probability of 81.3% for the first member 108a, a probability of 8.0% for the second member 108b, and a probability of 47.1% for the third member 108c for a first set of simulations performed based on Monte Carlo techniques.

Further, the example probability simulator 204 identifies the possible audience combinations (e.g., co-exposure combinations), which may include all or a subset of the possible combinations of the audience members. For the example household 102 of FIG. 1, the probability simulator 204 identifies eight possible audience combinations: co-exposure by the members 108a, 108b, 108c, co-exposure by only the members 108a, 108b, co-exposure by only the members 108a, 108c, co-exposure by only the members 108b, 108c, exposure by only the member 108a, exposure by only the member 108b, exposure by only the member 108c, and exposure by none of the members 108a, 108b, 108c.

Based on the probabilities produced by the first set of simulations for the respective members 108a, 108b, 108c of the household 102, the probability simulator 204 calculates probabilities for the identified audience combinations for the simulation set. For example, if a set of simulations selects a probability of 81.3% for the first member 108a, a probability of 8.0% for the second member 108b, and a probability of 47.1% for the third member 108c, the probability simulator 204 calculates the audience combination probabilities based on the calculations provided below in Table 1.

TABLE 1

| Audience Combination | Calculations | Probability |
|---|---|---|
| Members 108a, 108b, 108c | 0.813*0.08*0.471 | 3.1% |
| Members 108a, 108b | 0.813*0.08*(1.0-0.471) | 3.4% |
| Members 108a, 108c | 0.813*(1.0-0.08)*0.471 | 35.2% |
| Members 108b, 108c | (1.0-0.813)*0.08 *0.471 | 0.7% |
| Member 108a | 0.813*(1.0-0.08)*(1.0-0.471) | 39.5% |
| Member 108b | (1.0-0.813)*0.08*(1.0-0.471) | 0.8% |
| Member 108c | (1.0-0.813)*(1.0-0.08)*0.471 | 8.1% |
| No Member | (1.0-0.813)*(1.0-0.08)*(1.0-0.471) | 9.1% |

As indicated above in Table 1, the example probability simulator 204 determines, based on the values randomly-selected via the first set of simulations, a 3.1% probability that the members 108a, 108b, 108c were co-exposed to the media event of interest, a 3.4% probability that only the members 108a, 108b were co-exposed to the media event, a 35.2% probability that only the members 108a, 108c were co-exposed to the media event, etc.

In the example of Table 1, the probability simulator 204 treats the individual exposure probabilities for the different members 108a, 108b, 108c as being independent. Accordingly, the probability simulator 204 calculates a given audience combination probability by multiplying the relevant individual exposure probabilities for the different members 108a, 108b, 108c. Furthermore, if the probability simulator 204 calculates the probability of exposure to a media event to be "p" for the member 108a, then the probability of the member 108a not be exposed to the media event is "1-p."

The example probability simulator 204 performs a plurality of sets of simulations based on the probability distributions of the corresponding household members 108a, 108b, 108c. In some examples, the probability simulator 204 performs 10,000 sets of simulations based on the first probability distribution of the member 108a, the second probability distribution of the member 108b, and the third probability distribution of the member 108c that were determined by the distribution determiner 202. For example, the probability simulator 204 performs a second set of simulations, a third set of simulations, a fourth set of simulations, etc., each of which result in a different probabilities for the household members 108a, 108b, 108c and, thus, a different set of audience combination probabilities for the household 102.

The example simulation averager 206 determines average audience combination probabilities for the identified audience combinations based on the calculated audience combination probabilities of the sets of simulations performed by the example probability simulator 204. For example, the simulation averager 206 determines a first average audience combination probability for the audience combination in which all the household members 108a, 108b, 108c are exposed, a second average audience combination probability for the audience combination in which only the household members 108a, 108b are exposed, a third average audience combination probability for the audience combination in which only the household members 108a, 108c are exposed, etc.

To determine an average probability for an audience combination, the simulation averager 206 averages (e.g., calculates a mathematical mean of) the probabilities of the audience combination from the respective simulation sets performed by probability simulator 204. For example, to determine the average audience combination probability for the audience combination in which all three members 108a, 108b, 108c are exposed to the media event, the simulation averager 206 calculates the mean of the first simulation set's probability for that audience combination, the mean of the second simulation set's probability for that audience combination, the mean of the third simulation set's probability for that audience combination, etc. An example set of average audience combination probabilities determined by the simulation averager 206 for the household 102 is provided below in Table 2.

TABLE 2

| Audience Combination | Average Audience Combination Probability |
|---|---|
| Members 108a, 108b, 108c | 10.1% |
| Members 108a, 108b | 10.2% |
| Members 108a, 108c | 25.3% |
| Members 108b, 108c | 4.1% |
| Member 108a | 25.7% |
| Member 108b | 4.1% |
| Member 108c | 10.2% |
| No Member | 10.3% |

As indicated above in Table 2, the example simulation averager 206 calculates that there is a 10.1% probability of the members 108a, 108b, 108c being co-exposed to the media event of interest, a 10.2% probability of only the members 108a, 108b being co-exposed to the media event, a 25.3% probability of only the members 108a, 108c being co-exposed to the media event, etc. By calculating an average probability for an audience combination based on a plurality (e.g., 10,000) of simulations that randomly select a value (e.g., Monte Carlo simulations) from a probability distribution (e.g., a beta distribution, Dirichlet distribution), the example simulation averager 206 of the household characteristic calculator 126 accounts for uncertainty and/or variability that result, for example, from small sample sizes of collected exposure data.

The example query provider 208 of FIG. 2 receives queries that are to be determined by the example audience characteristic calculator 210 based on the average audience combination probabilities calculated by the simulation averager 206. An example conditional probability query received by query provider 208 includes, given that two of the three members 108a, 108b, 108c of the household 102 are exposed to an occurrence of the media event, what is the likelihood or probability that those two members are the member 108a and the member 108c. Additionally, the example query provider 208 may receive non-conditional probability queries such as the likelihood or probability that only one of the household members 108a, 108b, 108c was exposed to an occurrence of the media event.

The example audience characteristic calculator 210 utilizes the average audience combination probabilities calculated by the simulation averager 206 to determine an audience characteristic probability 212 corresponding to the query received by the query provider 208. For example, to determine the likelihood that the household members 108a, 108c are exposed to the media event given that two of the three household members 108a, 108b 108c are exposed to the media event, the audience characteristic calculator 210 divides the average audience combination probability for the combination of members 108a, 108c (e.g., 25.3% in Table 2) by the sum of the average audience combination probabilities for the respective combination of members 108a, 108b (e.g., 10.2% in Table 2), combination of members 108a, 108c, and combination of members 108b, 108c (e.g., 4.1% in Table 2). As another example, the audience characteristic calculator 210 sums the average audience combination probabilities for exposure only by the member 108a (e.g., 25.7% in FIG. 2), only by the member 108b (e.g., 4.1% in FIG. 2), and only by the member 108c (e.g., 10.2% in FIG. 2) to determine the likelihood or probability that only one of the household members 108a, 108b, 108c was exposed to an occurrence of the media event.

While an example manner of implementing the household characteristic calculator 126 of FIG. 1 is illustrated in FIG. 2, one or more of the elements, processes and/or devices illustrated in FIG. 2 may be combined, divided, re-arranged, omitted, eliminated and/or implemented in any other way. Further, the example distribution determiner 202, the example probability simulator 204, the example simulation averager 206, the example query provider 208, the example audience characteristic calculator 210 and/or, more generally, the example household characteristic calculator 126 of FIG. 1 may be implemented by hardware, software, firmware and/or any combination of hardware, software and/or firmware. Thus, for example, any of the example distribution determiner 202, the example probability simulator 204, the example simulation averager 206, the example query provider 208, the example audience characteristic calculator 210 and/or, more generally, the example household characteristic calculator 126 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example example distribution determiner 202, the example probability simulator 204, the example simulation averager 206, the example query provider 208, the example audience characteristic calculator 210 and/or, more generally, the example household characteristic calculator 126 is/are hereby expressly defined to include a tangible computer readable storage device or storage disk such as a memory, a digital versatile disk (DVD), a compact disk (CD), a Blu-ray disk, etc. storing the software and/or firmware. Further still, the example household characteristic calculator 126 may include one or more elements, processes and/or devices in addition to, or instead of, those illustrated in FIG. 2, and/or may include more than one of any or all of the illustrated elements, processes and devices.

Figure 3:
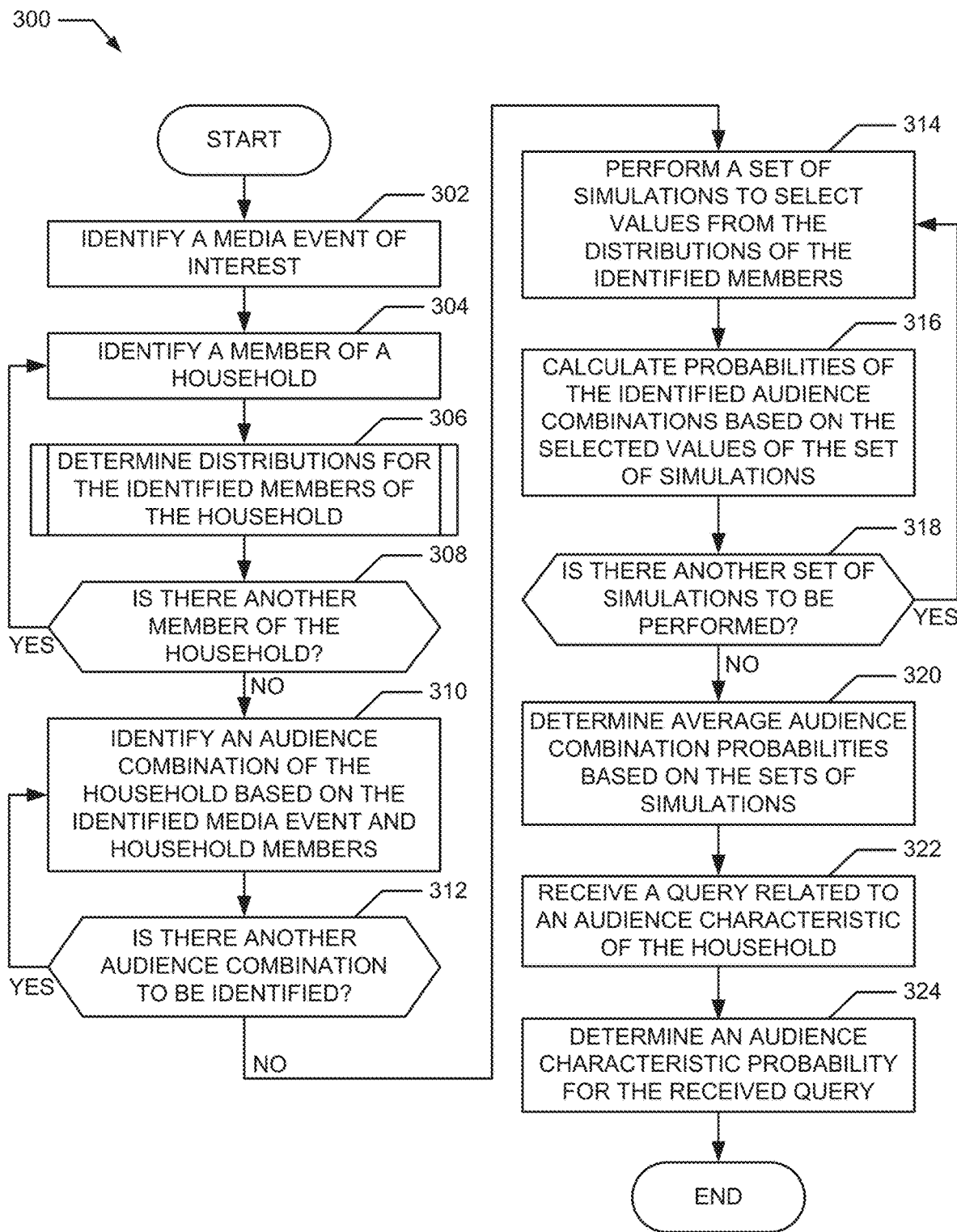
FIG. 3 is a flow diagram representative of example machine readable instructions that may be executed to implement the example household characteristic calculator of FIGS. 1 and/or 2 to determine the probability of the audience measurement characteristic of the household.
Figure 4:
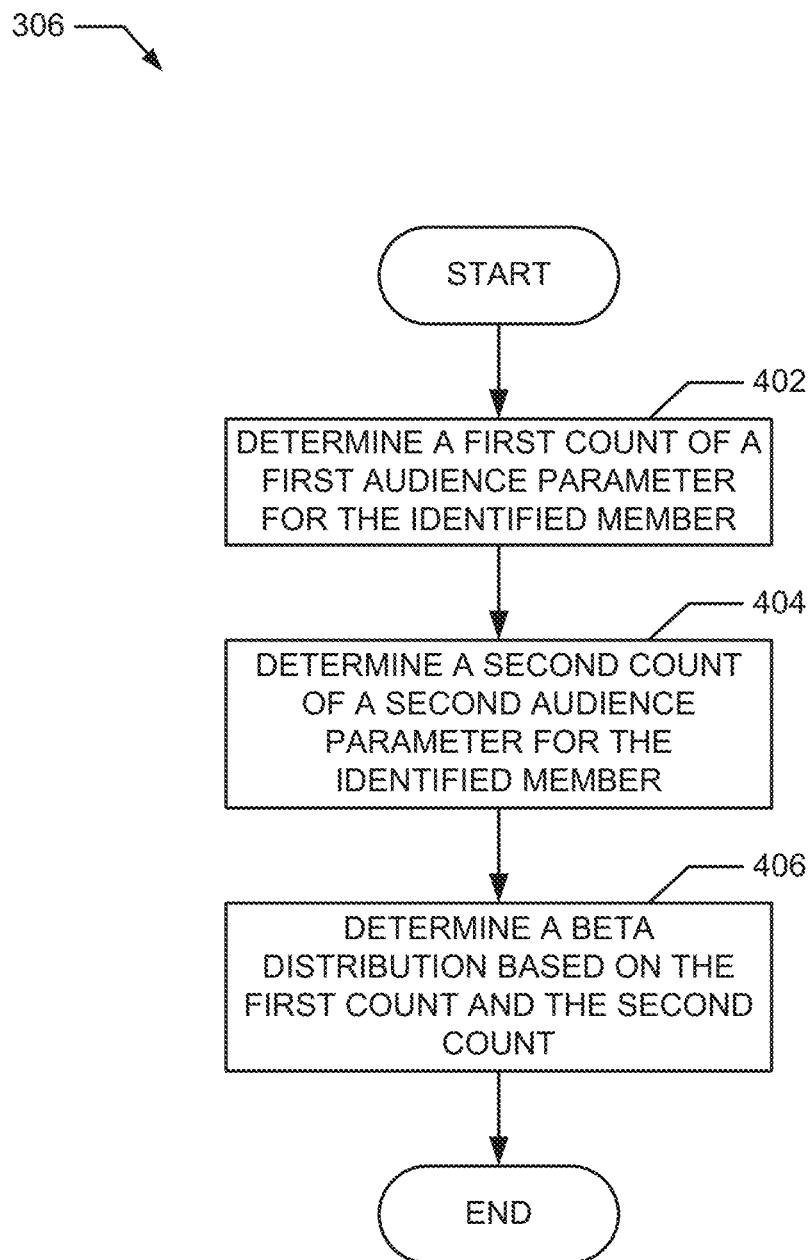
FIG. 4 is a flow diagram representative of first example machine readable instructions that may be executed to implement the example distribution determiner of FIG. 2 to determine the probability distributions of the members of the household.
Figure 5:
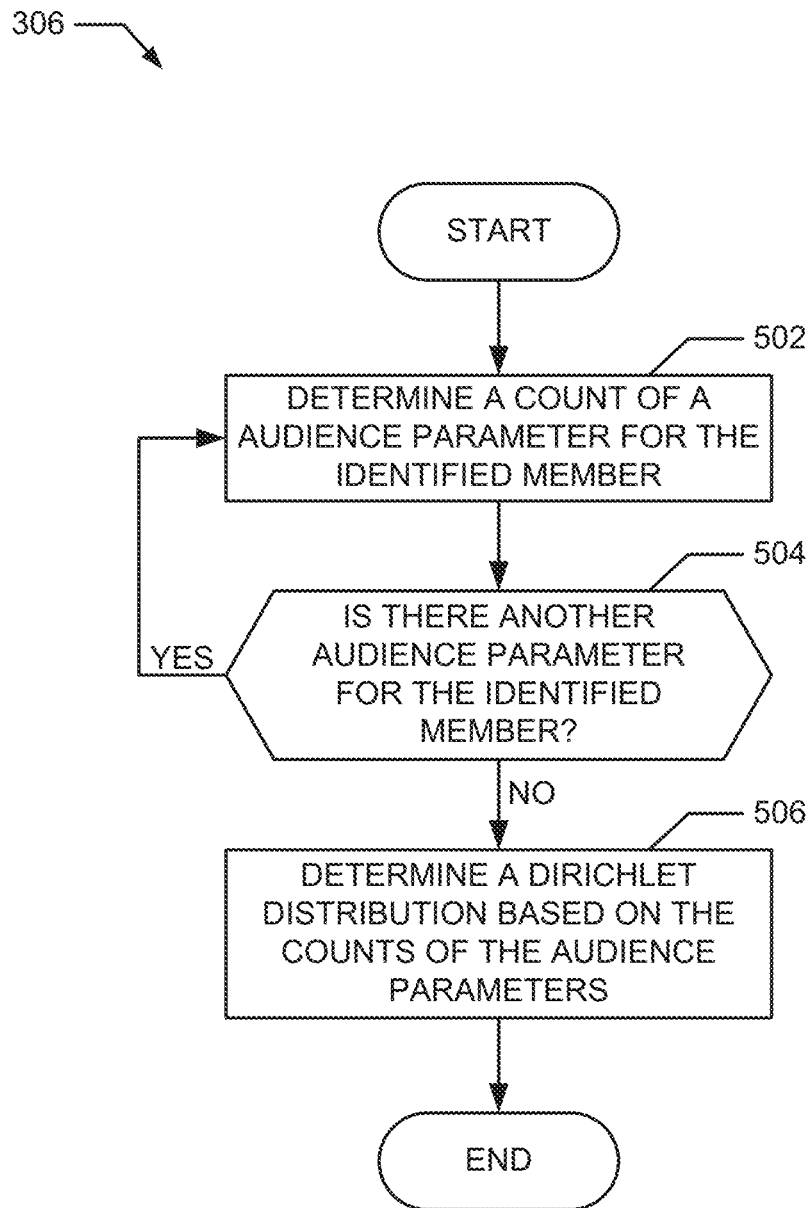
FIG. 5 is a flow diagram representative of second example machine readable instructions that may be executed to implement the example distribution determiner of FIG. 2 to determine the probability distributions of the members of the household.

A flowchart representative of example machine readable instructions for implementing the household characteristic calculator 126 of FIG. 1 is shown in FIG. 3. A flowchart representative of first example machine readable instructions for implementing the distribution determiner 202 of FIG. 2 is shown in FIG. 4. A flowchart representative of second example machine readable instructions for implementing the distribution determiner 202 of FIG. 2 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and 5, many other methods of implementing the example household characteristic calculator 126 may alternatively be used. For example, the order of execution of the blocks may be changed, and/or some of the blocks described may be changed, eliminated, or combined.

As mentioned above, the example processes of FIGS. FIGS. 3, 4, and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3, 4, and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example household characteristic calculator 126 of FIGS. 1 and/or 2 to determine the probability of the audience measurement characteristic of the example household 102. Initially, at block 302, the example distribution determiner 202 identifies a media event of interest. For example, the distribution determiner 202 identifies a program (e.g., "Brooklyn Nine-Nine"), a channel (e.g., FOX), a day (e.g., Sunday), a time or time period (e.g., 9:05 P.M., anytime between 9:00 P.M. and 9:30 P.M., etc.), a day-part (e.g., a "primetime" daypart), any combination thereof (e.g., a program/channel/day/time combination such as "Brooklyn Nine-Nine" on FOX at 9:00 P.M. on Sunday), etc.

After the media event is identified, the example distribution determiner 202 identifies a member of the household 102 (block 304). For example, the distribution determiner 202 identifies the first member 108a. At block 306, the example distribution determiner 202 determines an audience probability distribution for the identified household member (e.g., the member 108a). For example, the distribution determiner 202 utilizes the collected household data 122 of the example household 102 of FIG. 1 to determine a probability distribution (e.g., determines a beta distribution as described in further detail with FIG. 4, a Dirichlet distribution as described in further detail with FIG. 5). The probability distribution determined by the distribution determiner 202 at block 304 is a probability density function or the like that represents a likelihood that the identified household member 108a was exposed to the identified media event of interest. At block 308, the distribution determiner 202 determines if there is another member of the household 102. If there is another household member, the distribution determiner 202 repeats blocks 304, 306, 308 until no members of the household 102 remain unidentified.

At block 310, the example probability simulator 204 identifies an audience combination of the example household 102 based on the media event identified at block 302 and the example household members 108a, 108b, 108c identified at block 304. For example, the probability simulator 204 identifies a co-exposure audience combination, such as a combination in which some subset or all of the identified household members 108a, 108b, 108c are co-exposed to the identified media event of interest. Further, the probability simulator 204 determines if there is another audience combination to be identified for the household 102. If there are other audience combinations, the probability simulator 204 repeats blocks 310, 312 until no other audience combinations for the household 102 remain. For example, blocks 310, 312 are repeated by the probability simulator 204 to identify the following audience combinations for the household 102: co-exposure by the members 108a, 108b, co-exposure by the members 108a, 108c, co-exposure by the members 108b, 108c, exposure by the member 108a, exposure by the member 108b, exposure by the member 108c, and exposure by none of the members 108a, 108b, 108c.

At block 314, the example probability simulator 204 performs a set of simulations to select probability values from the probability distributions determined at block 306 for the example household members 108a, 108b, 108c identified at block 304. For example, the probability simulator 204 performs a first set of simulations that includes a first simulation to randomly select a first probability value (e.g., 81.3%) from the probability distribution of the first member 108a, a second simulation to randomly select a second probability value (e.g., 8.0%) from the probability distribution of the second member 108b, and a third simulation to randomly select a third probability value (e.g., 47.1%) from the probability distribution of the third member 108c. To select the probability values from the respective probability distributions, the probability simulator 204 utilizes Monte Carlo simulations and/or any other techniques, methods and/or algorithms that randomly select a value from a data set.

After the set of simulations is performed, the example probability simulator 204 calculates probabilities of the identified audience combinations based on the randomly-selected probability values (block 316). For example, if the set of simulations performed by the probability simulator at block 314 produces a probability of 81.3% for the first member 108a, a probability of 8.0% for the second member 108b, and a probability of 47.1% for the third member 108c, the probability simulator 204 calculates the following probabilities for the audience combinations identified at block 310 as provided below in Table 3.

TABLE 3

| Audience Combination | Calculations | Probability |
| --- | --- | --- |
| Members 108a, 108b, 108c | 0.813*0.08*0.471 | 3.1% |
| Members 108a, 108b | 0.813*0.08*(1.0-0.471) | 3.4% |
| Members 108a, 108c | 0.813*(1.0-0.08)*0.471 | 35.2% |
| Members 108b, 108c | (1.0-0.813)*0.08 *0.471 | 0.7% |

TABLE 3-continued

| Audience Combination | Calculations | Probability |
| --- | --- | --- |
| Member 108a | 0.813*(1.0-0.08)*(1.0-0.471) | 39.5% |
| Member 108b | (1.0-0.813)*0.08*(1.0-0.471) | 0.8% |
| Member 108c | (1.0-0.813)*(1.0-0.08)*0.471 | 8.1% |
| No Member | (1.0-0.813)*(1.0-0.08)*(1.0-0.471) | 9.1% |

As indicated above in Table 3, the example probability simulator 204 determines, based on the example probability values randomly-selected at block 314, a 3.1% probability that the members 108a, 108b, 108c were co-exposed to the identified media event, a 3.4% probability that only the members 108a, 108b were co-exposed to the identified media event, a 35.2% probability that only the members 108a, 108c were co-exposed to the identified media event, etc.

At block 318, the example probability simulator 204 determines whether there are other sets of simulations to be performed. In some examples, the number of sets of simulations to be performed by the probability simulator 204 is static (e.g., 10,000 sets of simulations), specified by an input value, etc. If there is another set of simulations to be performed, the probability simulator 204 repeats blocks 314, 316, 318 until no unperformed sets of simulations remain. For example, the probability simulator 204 performs a second set of simulations (e.g., producing a probability of 62.2% for the first member 108a, a probability of 24.9% for the second member 108b, and a probability of 41.8% for the third member 108c), a third set of simulations (e.g., producing a probability of 65.2% for the first member 108a, a probability of 23.3% for the second member 108b, and a probability of 22.4% for the third member 108c), etc. at block 314 and calculates probabilities for the identified audience combinations of the example household 102 for those respective sets of simulations.

At block 320, the example simulation averager 206 determines average audience combination probabilities based on the calculated combination probabilities of the simulation sets performed by the example probability simulator 204. For example, the simulation averager 206 determines a first average audience combination probability for a first audience combination (e.g., in which all the household members 108a, 108b, 108c were co-exposed to the media event), a second average audience combination probability for a second audience combination (e.g., in which only the household members 108a, 108b are co-exposed to the media event), a third average audience combination probability for a third audience combination (e.g., in which only the household members 108a, 108c are co-exposed to the media event), etc.

To determine an average audience combination probability (e.g., a first average audience combination probability), the example simulation averager 206 calculates a mathematical mean of the corresponding audience combination probabilities (e.g., the first audience combination probabilities) from the simulation sets (e.g., the first simulation set, the second simulation set, the third simulation set, etc.). For example, to determine the average audience combination probability for the audience combination in which the three members 108a, 108b, 108c are co-exposed, the simulation averager 206 calculates the mean of the first audience combination probability of the first simulation set (e.g., 6.4%), the first audience combination probability of the second simulation set (e.g., 3.8%), the first audience combination probability of the third simulation set (e.g., 12.1%), etc. An example set of average audience combination probabilities determined by the simulation averager 206 for the household 102 is provided below in Table 4.

TABLE 4

| Audience Combination | Average Audience Combination Probability |
| --- | --- |
| Members 108a, 108b, 108c | 10.1% |
| Members 108a, 108b | 10.2% |
| Members 108a, 108c | 25.3% |
| Members 108b, 108c | 4.1% |
| Member 108a | 25.7% |
| Member 108b | 4.1% |
| Member 108c | 10.2% |
| No Member | 10.3% |

As indicated above in Table 4, the example simulation averager 206 determines a 10.1% probability or likelihood of the members 108a, 108b, 108c being co-exposed to the media event of interest, a 10.2% probability or likelihood of only the members 108a, 108b being co-exposed to the media event, a 25.3% probability or likelihood of only the members 108a, 108c being co-exposed to the media event, etc. By averaging the results of a plurality of simulations that are based on randomly-selected values of corresponding probability distributions, the simulation averager 206 accounts for uncertainty and/or variability (e.g., resulting from small sample sizes of collected exposure data).

At block 322, the example query provider 208 receives a query (e.g., a conditional probability query, a non-conditional probability query) related to an audience composition of the example household 102. An example conditional probability query received by query provider 208 relates to determining a likelihood or probability that the household members 108a, 108c are co-exposed to the media event in interest given that two of the three example members 108a, 108b, 108c of the household 102 are co-exposed to the media event.

Upon the example query provider 208 receiving the audience composition query, the query provider 208 provides the query to the example audience characteristic calculator 210. The audience characteristic calculator 210 calculates the example audience characteristic probability 212 for the received query based on the average audience combination probabilities calculated by the example simulation averager 206 (block 324). For example, the audience characteristic calculator 210 determines a likelihood or probability (e.g., 63.8%) of the household members 108a, 108c being the two household members of the household 102 that are exposed to the media event of interest by dividing the average audience combination probability for the combination of members 108a, 108c (e.g., 25.3% as shown above in Table 4) by the sum of the average audience combination probabilities for the respective combination of members 108a, 108b (e.g., 10.2% in Table 4), combination of members 108a, 108c, and combination of members 108b, 108c (e.g., 4.1% in Table 4).

FIG. 4 is a flow diagram representative of first example machine readable instructions 400 that may be executed to implement the example distribution determiner 202 to determine the probability distributions of the example identified members 108a, 108b, 108c of the example household 102. For example, the instructions 306 illustrated by the flow diagram of FIG. 4 may implement block 306 of FIG. 3.

Initially, at block 402, the example distribution determiner 202 determines a first count (e.g., a first quantity) that indicates a number of occurrences of a first audience parameter for the identified household member (e.g., the household member 108a). For example, the distribution determiner 202 determines (e.g., based on the collected exposure data 122 of FIG. 1) the first count for the household member 108a to be a number of occurrences for which the household member 108a was recorded as having been exposed to the media event in interest (e.g., previously, or within a measurement interval, etc.).

At block 404, the example distribution determiner 202 determines a second count (e.g., a second quantity) that indicates a number of occurrences of a second audience parameter for the identified household member (e.g., the household member 108a). For example, the distribution determiner 202 determines the second count for the household member 108a to be a number of occurrences for which the household member 108a was recorded as not having been exposed to the media event in interest (e.g., previously, or within a measurement interval, etc.).

At block 406, the example distribution determiner 202 determines a beta distribution based on the first count of block 402 and the second count of block 404. For example, the distribution determiner 202 determines a beta distribution for the example household member 108a based on the number of occurrences (e.g., five) that the household member 108a was identified as being exposed to the media event of interest and the number of occurrences (e.g., two) that the household member 108a was identified as not being exposed to the media event of interest. The beta distribution determined by the distribution determiner 202 represents a probability density function that models a probability or likelihood of the household member 108a being exposed to the media event of interest.

FIG. 5 is a flow diagram representative of second example machine readable instructions 500 that may be executed to implement the example distribution determiner 202 to determine the probability distributions of the example identified members 108a, 108b, 108c of the example household 102. For example, the instructions 306 illustrated by the flow diagram of FIG. 5 may implement block 306 of FIG. 3.

Initially, at block 502, the example distribution determiner 202 determines a first count (e.g., a first quantity) that indicates a number of occurrences of a first audience parameter for the identified household member (e.g., the household member 108a). For example, the distribution determiner 202 determines (e.g., based on the collected exposure data 122 of FIG. 1) the first count of the first audience parameter to be a number of occurrences for which the household member 108a was recorded as having been exposed to the media event in interest in the example first room 112a and/or via the first television 110a of the example household 102 (e.g., previously, or within a measurement interval, etc.).

At block 504, the example distribution determiner 202 identifies whether there is another audience parameter for the example identified household member 108a. If the distribution determiner 202 identifies that there is another audience parameter, the distribution determiner 202 repeats block 502 to determine the count for that audience parameter. For example, the distribution determiner 202 repeats block 502 to determine a second count of a second audience parameter to be a number of occurrences for which the household member 108a was recorded as having been exposed to the media event in interest in the example second room 112b and/or via the second television 110b of the example household 102. In some examples, the example distribution determiner 202 again repeats block 502 to determine a third count of a third audience parameter to be a number of occurrences for which the household member 108a was recorded as not having been exposed to the media event in interest. The distribution determiner 202 repeats blocks 502, 504 until no audience parameters remain for the example household member 108a.

At block 506, the example distribution determiner 202 determines a Dirichlet distribution based on the counts of the respective audience parameters that were determined at block 502. For example, the distribution determiner 202 determines a Dirichlet distribution for the example household member 108a based on the number of occurrences (e.g., four) that the household member 108a was identified as being exposed to the media event in the first room 112a, the number of occurrences (e.g., one) that the household member 108a was identified as being exposed to the media event in the second room 112b, and the number of occurrences (e.g., two) that the household member 108a was identified as not being exposed to the media event. In such examples, the Dirichlet distribution determined by the distribution determiner 202 represents a probability density function for a random occurrence of the media event of interest that models a probability or likelihood of the household member 108a being exposed to the media event in the first room 112a, a probability or likelihood of the household member 108a being exposed to the media event in the second room 112b, and a probability or likelihood of the household member 108a not being exposed to the media event in the household 102.

Figure 6:
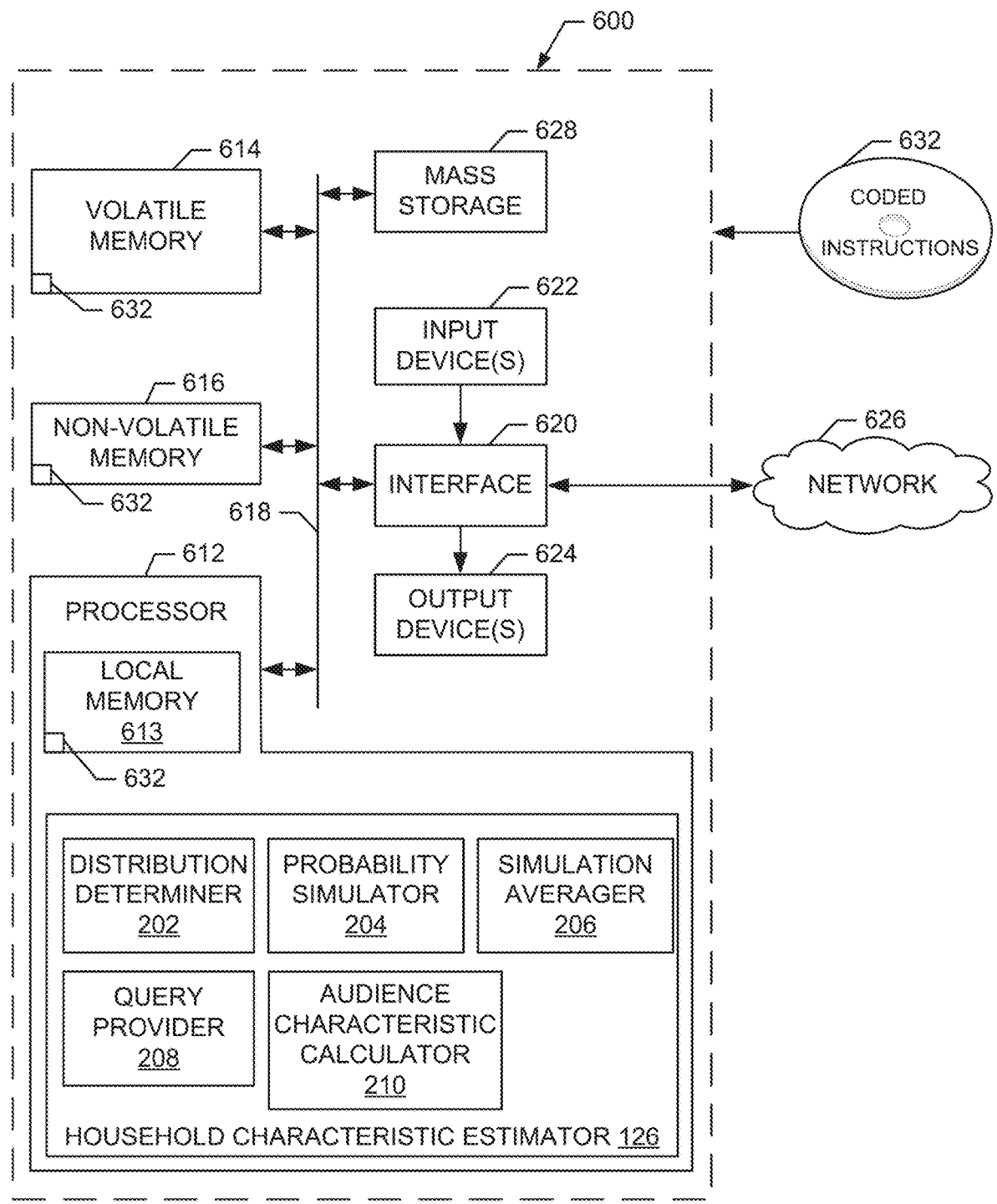
FIG. 6 is a block diagram of an example processor system structured to execute the example machine readable instructions represented by FIGS. 3, 4 and/or 5 to implement the example household characteristic calculator of FIGS. 1 and/or 2.

FIG. 6 is a block diagram of an example processor platform 600 structured to execute the instructions of FIGS. 3, 4, and/or 5 to implement the household characteristic calculator 126 of FIGS. 1 and/or 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The processor 612 of the illustrated example includes the example distribution determiner 202, the example probability simulator 204, the example simulation averager 206, the example query provider 208, the example audience characteristic calculator 210 and/or, more generally, the household characteristic calculator 126.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 of FIGS. 3, 4, and/or 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture enable an audience measurement entity to reduce an amount of exposure data collected by computer networked data collection systems on household members of a household to accurately determine audience measurement characteristics (e.g., conditional and/or co-exposure probabilities) of the household. For example, the above disclosed methods, apparatus and articles of manufacture perform sets of simulations utilizing probability distributions of the household members that are based on the collected exposure data associated with the household members. By utilizing the probability distributions and the corresponding sets of simulations, the above disclosed methods, apparatus and articles of manufacture account for and/or reduce uncertainty inherent to collected exposure data (e.g., resulting from a small sample size) when determining audience measurement characteristics based on collected exposure data and, thus, reduce an amount of exposure data that is to be collected by computer networked data collection systems to enable the audience measurement entity to accurately determine the audience measurement characteristics of the household.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for media audience measurement, the apparatus comprising:
   a probability simulator to:
      perform a first set of simulations that includes a first simulation for a first member of a household and a second simulation for a second member of the household, the first simulation to randomly select a first value from a first audience probability distribution, the second simulation to randomly select a second value from a second audience probability distribution;
      determine a first probability of a first audience combination based on one of the randomly-selected values of the first set of simulations;
      perform a second set of simulations that includes a third simulation for the first member and a fourth simulation for the second member, the third simulation to randomly select a third value from the first audience probability distribution, the fourth simulation to randomly select a fourth value from the second audience probability distribution of the second set of simulations; and
      determine a second probability of the first audience combination based on the randomly-selected third value and the randomly-selected fourth value; and
   a simulation averager to determine an average first audience combination probability based on the first probability and the second probability determined by the probability simulator to reduce a quantity of household data stored in a memory.

2. The apparatus as defined in claim 1, further including:
   a distribution determiner to:
      determine the first audience probability distribution for the first member of the household based on the quantity of household data stored in the memory; and
      determine the second audience probability distribution for the second member of the household based on the quantity of household data stored in the memory;
   the simulation averager to determine the first probability for the first audience combination and a second probability for a second audience combination based on the first audience probability distribution and the second audience probability distribution; and
   an audience characteristic determiner to determine a household audience characteristic probability based on the first audience combination and the second audience combination, the household audience characteristic probability indicating likelihoods of different possible audience compositions of the household for a media event.

3. The apparatus as defined in claim 2, wherein the distribution determiner is to:
   determine the first audience probability distribution based on a first count of a first audience parameter and a second count for a second audience parameter for the first member; and
   determine the second audience probability distribution based on a third count of the first audience parameter and a fourth count for the second audience parameter for the second member, the first audience parameter corresponding to exposure to the media event and the second audience parameter corresponding to non-exposure to the media event.

4. The apparatus as defined in claim 3, wherein the distribution determiner is to:
   determine a first beta distribution for the first member to determine the first audience probability distribution; and
   determine a second beta distribution for the second member to determine the second audience probability distribution.

5. The apparatus as defined in claim 2, wherein the distribution determiner is to:
   determine a first Dirichlet distribution for the first member to determine the first audience probability distribution, the first Dirichlet distribution being determined based on a first count of a first audience parameter, a second count for a second audience parameter, and a third count for a third audience parameter for the first member; and
   determine a second Dirichlet distribution for the second member determine the second audience probability distribution, the second Dirichlet distribution being determined based on a fourth count of the first audience parameter, a fifth count for the second audience parameter, and a sixth count for the third audience parameter for the second member, the first audience parameter corresponding to exposure to the media event via a first media presentation device of the household, the second audience parameter corresponding to exposure to the media event via a second media presentation device of the household, and the third audience parameter corresponds to non-exposure to the media event.

6. The apparatus as defined in claim 2, wherein, to determine the household audience characteristic probability, the audience characteristic determiner is to determine a conditional probability based on the first audience combination and the second audience combination, the conditional probability indicative of a probability of a second event given a first event has occurred.

7. A tangible computer readable storage medium comprising instructions which, when executed, cause a machine to at least:
   perform a first set of simulations that includes a first simulation for a first member of a household and a second simulation for a second member of the household, the first simulation to randomly select a first value from a first audience probability distribution, the second simulation to randomly select a second value from a second audience probability distribution;
   determine a first probability of a first audience combination based on a randomly-selected first value and a randomly-selected second value of the first set of simulations;
   perform a second set of simulations that includes a third simulation for the first member and a fourth simulation for the second member, the third simulation to randomly select a third value from the first audience probability distribution, the fourth simulation to randomly select a fourth value from the second audience probability distribution of the second set of simulations;
   determine a second probability of the first audience combination based on the randomly-selected third value and the randomly-selected fourth value; and
   determine an average first audience combination probability based on the first probability and the second probability to reduce a quantity of household data stored in a memory.

8. The tangible computer readable storage medium as defined in claim 7, the instructions further cause the machine to:
- determine the first audience probability distribution for the first member of the household based on the quantity of household data stored in the memory; and
- determine the second audience probability distribution for the second member of the household based on the quantity of household data stored in the memory;
- determine the first probability for the first audience combination and a second probability for a second audience combination based on the first audience probability distribution and the second audience probability distribution; and
- determine a household audience characteristic probability based on the first audience combination and the second audience combination, the household audience characteristic probability indicating likelihoods of different possible audience compositions of the household for a media event.

9. The tangible computer readable storage medium as defined in claim 8, the instructions further cause the machine to:
- determine the first audience probability distribution based on a first count of a first audience parameter and a second count for a second audience parameter for the first member; and
- determine the second audience probability distribution based on a third count of the first audience parameter and a fourth count for the second audience parameter for the second member, the first audience parameter corresponding to exposure to the media event and the second audience parameter corresponding to non-exposure to the media event.

10. The tangible computer readable storage medium as defined in claim 9, the instructions further cause the machine to:
- determine a first beta distribution for the first member to determine the first audience probability distribution; and
- determine a second beta distribution for the second member to determine the second audience probability distribution.

11. The tangible computer readable storage medium as defined in claim 8, the instructions further cause the machine to:
- determine a first Dirichlet distribution for the first member to determine the first audience probability distribution, the first Dirichlet distribution being determined based on a first count of a first audience parameter, a second count for a second audience parameter, and a third count for a third audience parameter for the first member; and
- determine a second Dirichlet distribution for the second member determine the second audience probability distribution, the second Dirichlet distribution being determined based on a fourth count of the first audience parameter, a fifth count for the second audience parameter, and a sixth count for the third audience parameter for the second member, the first audience parameter corresponding to exposure to the media event via a first media presentation device of the household, the second audience parameter corresponding to exposure to the media event via a second media presentation device of the household, and the third audience parameter corresponds to non-exposure to the media event.

12. The tangible computer readable storage medium as defined in claim 8, the instructions further cause the machine to determine a conditional probability based on the first audience combination and the second audience combination, the conditional probability indicative of a probability of a second event given a first event has occurred.

13. The tangible computer readable storage medium as defined in claim 8, wherein the determining of the household audience characteristic probability based on the first audience probability distribution and the second audience probability distribution reduces an amount of data collected by computer networked data collection systems for the first member and the second member of the household.

14. An apparatus for media audience measurement, the apparatus comprising:
- means for simulating to:
  - perform a first set of simulations that includes a first simulation for a first member of a household and a second simulation for a second member of the household, the first simulation to randomly select a first value from a first audience probability distribution, the second simulation to randomly select a second value from a second audience probability distribution;
  - determine a first probability of a first audience combination based on one of the randomly-selected values of the first set of simulations;
  - perform a second set of simulations that includes a third simulation for the first member and a fourth simulation for the second member, the third simulation to randomly select a third value from the first audience probability distribution, the fourth simulation to randomly select a fourth value from the second audience probability distribution of the second set of simulations; and
  - determine a second probability of the first audience combination based on the randomly-selected third value and the randomly-selected fourth value; and
- means for averaging a simulation to determine an average first audience combination probability based on the first probability and the second probability determined by the means for simulating to reduce a quantity of household data stored in a memory.

15. The apparatus as defined in claim 14, further including:
- means for determining a distribution to:
  - determine the first audience probability distribution for the first member of the household based on the quantity of household data stored in the memory; and
  - determine the second audience probability distribution for the second member of the household based on the quantity of household data stored in the memory;
- the means for averaging a simulation to determine the first probability for the first audience combination and a second probability for a second audience combination based on the first audience probability distribution and the second audience probability distribution; and
- means for determining an audience characteristic to determine a household audience characteristic probability based on the first audience combination and the second audience combination, the household audience characteristic probability indicating likelihoods of different possible audience compositions of the household for a media event.

16. The apparatus as defined in claim 15, wherein the means for determining a distribution is to:
    determine the first audience probability distribution based on a first count of a first audience parameter and a second count for a second audience parameter for the first member; and
    determine the second audience probability distribution based on a third count of the first audience parameter and a fourth count for the second audience parameter for the second member, the first audience parameter corresponding to exposure to the media event and the second audience parameter corresponding to non-exposure to the media event.

17. The apparatus as defined in claim 15, wherein the means for determining a distribution is to:
    determine a first beta distribution for the first member to determine the first audience probability distribution; and
    determine a second beta distribution for the second member to determine the second audience probability distribution.

18. The apparatus as defined in claim 15, wherein the means for determining a distribution is to:
    determine a first Dirichlet distribution for the first member to determine the first audience probability distribution, the first Dirichlet distribution being determined based on a first count of a first audience parameter, a second count for a second audience parameter, and a third count for a third audience parameter for the first member; and
    determine a second Dirichlet distribution for the second member determine the second audience probability distribution, the second Dirichlet distribution being determined based on a fourth count of the first audience parameter, a fifth count for the second audience parameter, and a sixth count for the third audience parameter for the second member, the first audience parameter corresponding to exposure to the media event via a first media presentation device of the household, the second audience parameter corresponding to exposure to the media event via a second media presentation device of the household, and the third audience parameter corresponds to non-exposure to the media event.

19. The apparatus as defined in claim 15, wherein, to determine the household audience characteristic probability, the means for determining an audience characteristic is to determine a conditional probability based on the first audience combination and the second audience combination, the conditional probability indicative of a probability of a second event given a first event has occurred.

20. An apparatus comprising:
    at least one memory;
    instructions in the apparatus; and
    processor circuitry to execute the instructions to:
        perform a first set of simulations that includes a first simulation for a first member of a household and a second simulation for a second member of the household, the first simulation to randomly select a first value from a first audience probability distribution, the second simulation to randomly select a second value from a second audience probability distribution;
        determine a first probability of a first audience combination based on one of the randomly-selected values of the first set of simulations;
        perform a second set of simulations that includes a third simulation for the first member and a fourth simulation for the second member, the third simulation to randomly select a third value from the first audience probability distribution, the fourth simulation to randomly select a fourth value from the second audience probability distribution of the second set of simulations;
        determine a second probability of the first audience combination based on the randomly-selected third value and the randomly-selected fourth value; and
        determine an average first audience combination probability based on the first probability and the second probability to reduce a quantity of household data stored in a memory.

21. The apparatus as defined in claim 20, wherein the processor circuitry is to:
    determine the first audience probability distribution for the first member of the household based on the quantity of household data stored in the memory;
    determine the second audience probability distribution for the second member of the household based on the quantity of household data stored in the memory;
    determine the first probability for the first audience combination and a second probability for a second audience combination based on the first audience probability distribution and the second audience probability distribution; and
    determine a household audience characteristic probability based on the first audience combination and the second audience combination, the household audience characteristic probability indicating likelihoods of different possible audience compositions of the household for a media event.

22. The apparatus as defined in claim 21, wherein the processor circuitry is to:
    determine the first audience probability distribution based on a first count of a first audience parameter and a second count for a second audience parameter for the first member; and
    determine the second audience probability distribution based on a third count of the first audience parameter and a fourth count for the second audience parameter for the second member, the first audience parameter corresponding to exposure to the media event and the second audience parameter corresponding to non-exposure to the media event.

23. The apparatus as defined in claim 22, wherein the processor circuitry is to:
    determine a first beta distribution for the first member to determine the first audience probability distribution; and
    determine a second beta distribution for the second member to determine the second audience probability distribution.

24. The apparatus as defined in claim 21, wherein the processor circuitry is to:
    determine a first Dirichlet distribution for the first member to determine the first audience probability distribution, the first Dirichlet distribution being determined based on a first count of a first audience parameter, a second count for a second audience parameter, and a third count for a third audience parameter for the first member; and
    determine a second Dirichlet distribution for the second member determine the second audience probability distribution, the second Dirichlet distribution being determined based on a fourth count of the first audience parameter, a fifth count for the second audience parameter, and a sixth count for the third audience parameter for the second member, the first audience parameter corresponding to exposure to the media event via a first media presentation device of the household, the second audience parameter corresponding to exposure to the media event via a second media presentation device of the household, and the third audience parameter corresponds to non-exposure to the media event.

25. The apparatus as defined in claim 21, wherein, to determine the household audience characteristic probability, the processor circuitry is to determine a conditional probability based on the first audience combination and the second audience combination, the conditional probability indicative of a probability of a second event given a first event has occurred.

* * * * *